(12) United States Patent
Adachi

(10) Patent No.: US 9,030,754 B2
(45) Date of Patent: May 12, 2015

(54) ZOOM LENS

(71) Applicant: Tamron Co., Ltd., Saitama-shi (JP)

(72) Inventor: Nobuyuki Adachi, Saitama (JP)

(73) Assignee: Tamron Co., Ltd., Saitama (JP)

( * ) Notice: Subject to any disclaimer, the term of this patent is extended or adjusted under 35 U.S.C. 154(b) by 0 days.

(21) Appl. No.: 14/100,617

(22) Filed: Dec. 9, 2013

(65) Prior Publication Data

US 2014/0177065 A1    Jun. 26, 2014

(30) Foreign Application Priority Data

Dec. 26, 2012   (JP) .................................. 2012-282949

(51) Int. Cl.
  *G02B 15/14*   (2006.01)
  *G02B 15/173*  (2006.01)
  *G02B 27/64*   (2006.01)

(52) U.S. Cl.
  CPC ............ *G02B 15/173* (2013.01); *G02B 27/646* (2013.01)

(58) Field of Classification Search
  CPC ............................ G02B 15/173; G02B 27/646
  USPC ....................................................... 359/687
  See application file for complete search history.

(56) References Cited

U.S. PATENT DOCUMENTS 7,136,231 B2 *  11/2006  Ito et al. ..................... 359/687

FOREIGN PATENT DOCUMENTS

| JP | 2008304952 A | 12/2008 |
| JP | 2009271471 A | 11/2009 |
| JP | 201044103 A | 2/2010 |

* cited by examiner

*Primary Examiner* — William Choi
(74) *Attorney, Agent, or Firm* — The Webb Law Firm

(57) ABSTRACT

A high-power zoom lens that achieves size and price reduction, and at the same time provides high-quality imaging. This lens includes at least four lens groups arranged along an optical axis, which are moveable along the axis in order to achieve changes in magnification. The first, third, and fourth lens groups have positive refractive powers, and the second group has a negative refractive power. The second lens group includes a negative meniscus lens arranged closest to the object, provided with a convex surface at the object side. A negative lens is arranged next to the negative meniscus lens, and a negative lens provided with a concave surface at the object side is arranged closest to the image. The fourth lens group includes at least two positive lenses and one negative lens.

13 Claims, 18 Drawing Sheets

Fig. 35

| Ex-pression | Example 1 | Example 2 | Example 3 | Example 4 | Example 5 | Example 6 | Example 7 | Example 8 | Example 9 | Example 10 | Example 11 |
|---|---|---|---|---|---|---|---|---|---|---|---|
| (1) | 1.531 | 1.535 | 1.535 | 1.535 | 1.535 | 1.535 | 1.509 | 1.544 | 1.592 | 1.531 | 1.531 |
| (2) | 58.266 | 55.729 | 55.729 | 55.729 | 55.729 | 55.729 | 59.243 | 58.856 | 41.694 | 58.605 | 58.266 |
| (3) | 2.368 | 2.8 | 3.157 | 1.9 | 2.295 | 2.005 | 2.575 | 2.143 | 2.171 | 2.49 | 2.377 |
| (4) | 11.603 | 15.3 | 18.11 | 4.799 | 6.903 | 3.262 | 11.311 | 4.796 | 5.049 | 11.351 | 13.513 |
| (5) | -0.018 | 0.02 | 0.05 | -0.05 | -0.02 | -0.03 | -0.009 | -0.01 | -0.003 | -0.013 | -0.012 |
| (6) | -36.774 | -38.944 | -39.032 | -30.143 | -42 | -35.001 | -39.896 | -37.397 | -37.147 | -38.528 | -37.895 |
| (7) | 0.320 | 0.326 | 0.322 | 0.362 | 0.300 | 0.342 | 0.305 | 0.337 | 0.34 | 0.304 | 0.307 |

ZOOM LENS

CROSS-REFERENCE TO RELATED APPLICATIONS

This application claims priority to Japanese Patent Application No. 2012-282949, filed Dec. 26, 2012, the disclosure of which is hereby incorporated in its entirety by reference.

BACKGROUND OF THE INVENTION

1. Field of the Invention

The present invention relates to a zoom lens, and more particularly, to a high-power zoom lens.

2. Background Art

Recently, high-power zoom lenses having a magnification exceeding 10 have been paid attention as an interchangeable lens for a single-lens reflex camera. Such a zoom lens is required to have high-quality imaging performance, and also required to be compact and low price. Depending on the favor for a digital single-lens reflex camera in recent years, a demand on these performances is increasingly growing in the zoom lenses for amateur use.

Since the high-power zoom lenses consist of a plurality of lens groups and should have moving mechanisms for moving the lens groups, the high-power zoom lenses tend to be bigger than the fixed focal length lenses. So, diameter of a filter or a lens barrel shall decrease because requirement for the compact zoom lenses is especially high among the performances from the viewpoint of portability and easy handling. On the other hand, an optical system having high imaging performance through selecting an inexpensive glass material should be achieved to reduce cost while maintaining a high level imaging performance. In recent years, zoom lenses with a full-time manual function have been popular. The full-time manual function enables instant switching to a manual focus mode in response to the rotation of a focus ring or the like even when the camera is set to an auto focus mode. Thus, the optical design of the optical systems in the zoom lenses have been complicated more and more because optical systems in the zoom lenses are also required to meet the new functions described above.

Then, as a conventional technology relating to the zoom lens, technologies disclosed in Japanese Patent Laid-Open Nos. 2009-271471, 2008-304952 and 2010-44103 exist. A zoom lens disclosed in Japanese Patent Laid-Open No. 2009-271471 consists of a first lens group having a positive refractive power, a second lens group having a negative refractive power, a third lens group having a positive refractive power, and a fourth lens group having a positive refractive power arranged in this order from an object side to an image side and a plurality of lens groups move along an optical axis direction to change magnification. The second lens group functions as a focusing lens group. The second lens group moves in focusing to adjust the focus. As the zoom lens includes the optical system as described above, Japanese Patent Laid-Open No. 2009-271471 proposes a zoom lens that satisfies the conditions described later when a negative lens locates at closest to the object in a plurality of lenses constituting the second lens group is referred to as a lens $2a$, and the refractive index and the Abbe number of the material for the lens $2a$ are $n2a$ and $v2a$ respectively.

$$[-0.0125*v2a+2.175]<n2a<[-0.011*v2a+2.21]$$

$$42.0<v2a<59.0$$

A zoom lens disclosed in Japanese Patent Laid-Open No. 2008-304952 consists of a first lens group having a positive refractive power, a second lens group having a negative refractive power, a third lens group having a positive refractive power, and a fourth lens group having a positive refractive power arranged in this order from an object side. The respective lens groups move along an optical axis direction to increase distance between the first lens group and the second lens group, to decrease distance between the second lens group and the third lens group and changes distance between the third lens group and the fourth lens group to change magnification from a wide-angle end to a telescope end. The third lens group consists of a front group having a positive refractive power and a rear group having a negative refractive power arranged in this order from the object side and only the rear group moves in the direction perpendicular to the optical axis for image correction against camera shake. A zoom lens having a vibration compensation function that satisfies the following expression wherein the focal length of the zoom lens in a wide-angle end is fw and the focal length of the first lens group is f1 is proposed.

$$1.5<[f1/fw]<8.0$$

Next, Japanese Patent Laid-Open No. 2010-44103 discloses a zoom lens consists of a first lens group having a positive refractive power, a second lens group having a negative refractive power, a third lens group having a positive refractive power, and a fourth lens group having a positive refractive power arranged in this order from an object side. The respective lens groups move along an optical axis direction to increase distance between the first lens group and the second lens group, to decrease distance between the second lens group and the third lens group, and to decrease distance between the third lens group and the fourth lens group to change magnification from an wide-angle end to a telescope end. The second lens group as a focusing lens moves to the object side in focusing. In the optical system described above, a zoom lens having a vibration compensation function that satisfies the following expression wherein the focal length of the first lens group is f1, the focal length of the second lens group is f2, the focal length of the third lens group is f3, and the focal length of the entire optical system is ft is proposed in Japanese Patent Laid-Open No. 2010-44103.

$$0.35<[f1/ft]<0.45$$

$$0.04<[|f2|/ft]<0.065$$

$$0.15<[f3/ft]<0.25$$

SUMMARY OF THE INVENTION

Problems to be Solved by the Invention

In the zoom lenses disclosed in Japanese Patent Laid-Open Nos. 2009-271471 and 2008-304952, cost reduction and light weight of a focusing mechanism are achieved. Specifically, feature of the invention disclosed in Japanese Patent Laid-Open No. 2009-271471 is that a resin lens made of a resin material locates at closest to the object in the second lens group that moves in focusing. As the lens locates at closest to the object among the plurality of lenses constituting the second lens group has a larger lens diameter than the other lenses and increases weight, the resin lens employed as the second lens group can reduce weight to achieve high-speed AF (auto focusing) and less power consumption. However, when the resin lens is employed as the lens locates at closest to the object among the plurality of lenses constituting the second lens group, the lens diameter increases since the resin material generally has a lower refractive index than that of a glass material. As the increase in the lens diameter conflicts with a decrease in the diameter of a filter or a lens barrel, it is not preferable from the viewpoint to achieve the compact zoom lens. Further, Examples in Japanese Patent Laid-Open No. 2009-271471 only disclose a low-power zoom lens with a magnification of about 4, i.e. a high-power zoom lens with a magnification of more than 10 is not disclosed.

The zoom lens disclosed in Japanese Patent Laid-Open No. 2008-304952 achieves high imaging performance while ensuring a high ratio for magnification change. However, as a filter has a large diameter and total optical length is long, the zoom lens does not qualify a level to achieve the downsizing required in the present invention.

The invention disclosed in Japanese Patent Laid-Open No. 2010-44103 achieves high imaging performance, and further achieves decreased filter diameter and less total optical length while ensuring a high ratio for magnification change. However, as the optical system consists of a large number of lenses, the invention does not qualify a level to achieve cost reduction required in the present invention.

Then, an object of the present invention is to provide a high-power zoom lens in which downsizing and price reduction are further achieved at the same time while achieving high-quality imaging performance.

Means to Solve the Problem

As a result of intensive study, the present inventors have achieved the object by employing the following lens arrangement.

A zoom lens consists of at least a first lens group having a positive refractive power, a second lens group having a negative refractive power, a third lens group having a positive refractive power, and a fourth lens group having a positive refractive power arranged in this order from an object side to constitute an optical system, and all the lens groups constituting the optical system move along an optical axis direction for adjustment of distance between the respective lens groups to achieve a predetermined magnification change, wherein the second lens group consists of a negative meniscus lens arranged at closest to the object provided with a convex surface at the object side, a negative lens arranged next to the negative meniscus lens and a negative lens arranged at closest to an image provided with a concave surface at the object side, the fourth lens group consists of at least two positive lenses and one negative lens, and characterized in that the lenses arranged in the second lens group and the fourth lens group satisfy following expressions (1) and (2).

[Expression 1]

$$1.48 \leq (NV+NL)/2 \leq 1.62 \quad (1)$$

$$38 \leq (VV/VL)/2 \leq 62 \quad (2)$$

in the expressions (1) and (2);
NV: Refractive index for a d-line of the negative lens in the second lens group arranged next to the negative meniscus lens
VV: Abbe number of the negative lens in the second lens group arranged next to the negative meniscus lens
NL: Refractive index for a d-line of the lens in the fourth lens group arranged at closest to the object
VL: Abbe number of the lens in the fourth lens group arranged at the closest to the object.

In the zoom lens according to the present invention, it is preferable to satisfy the following expression (3).

[Expression 2]

$$1.6 \leq f22/f21 \leq 3.4 \quad (3)$$

in the expression (3);
f21: Focal length of the negative meniscus lens in the second lens group arranged at closest to the object
f22: Focal length of the negative lens in the second lens group arranged next to the negative meniscus lens.

In the zoom lens according to the present invention, the lens in the fourth lens group arranged at closest to the object is preferable to be a double-sided aspherical lens provided with aspherical surfaces at both sides, and satisfies a following expression (4).

[Expression 3]

$$2.9 \leq |fp/f4| \leq 19.5 \quad (4)$$

in the expression (4);
f4: Focal length of the fourth lens group
fp: Focal length of the lens in the fourth lens group arranged at closest to the object.

In the zoom lens according to the present invention, the negative lens in the second lens group arranged next to the negative meniscus lens is preferable to be provided with an aspherical surface at least on an image side, and satisfies a following expression (5).

[Expression 4]

$$-0.07 \leq \Delta 2/f2 \leq 0.07 \quad (5)$$

In the expression (5);
$\Delta 2$: Deformation amount of the aspherical surface relative to the base spherical surface from the optical axis to the effective radial position.

In the zoom lens according to the present invention, it is preferable to satisfy the following expression (6).

[Expression 5]

$$-44 \leq f123t/f4 \times Z \leq -23 \quad (6)$$

in the expression (6);
f123t: Synthetic focal length of the first lens group to the third lens group at a telescope end
f4: Focal length of the fourth lens group
Z: Zoom ratio ([a focal length at the telescope end]/[a focal length at a wide-angle end]).

In the zoom lens according to the present invention, it is preferable to satisfy the following expression (7).

[Expression 6]

$$0.21 \leq |M2/M1| \leq 0.42 \quad (7)$$

in the expression (7);
M1: Travel distance of the first lens group from the wide-angle end to the telescope end (travel distance to the object side is positive)
M2: Travel distance of the second lens group from the wide-angle end to the telescope end (travel distance to the object side is positive).

In the lens arrangement of the zoom lens according to the present invention, the lens arrangement may be that the lens groups move from a wide-angle end to a telescope end for magnification change to increase distance between the first lens group and the second lens group, to decrease distance between the second lens group and the third lens group, and to decrease distance between the third lens group and the fourth lens group.

In the zoom lens according to the present invention, the third lens group consists of a group 3a having a positive refractive power and a group 3b having a negative refractive power, wherein the group 3b is preferable to shift in the direction perpendicular to the optical axis for vibration compensation.

In the lens arrangement of the zoom lens according to the present invention, the third lens group consists of a group 3a having a positive refractive power and a group 3b having a negative refractive power, wherein the lens groups may move from a wide-angle end to a telescope end for magnification change through increasing distance between the first lens group and the second lens group, decreasing distance between the second lens group and the group 3a to change distance between the group 3a and the group 3b, and decrease distance between the group 3b and the fourth lens group. Further, the group 3b may shift in the direction perpendicular to the optical axis for vibration compensation.

In the lens arrangement of the zoom lens according to the present invention, the lens groups constituting the optical system consists of the first lens group to the fourth lens group and the fifth lens group next to the fourth lens group, wherein the lens groups may be arranged to move from a wide-angle end to a telescope end to increase distance between the first lens group and the second lens group, to decrease distance between the second lens group and the third lens group, to decrease distance between the third lens group and the fourth lens group and to increase distance between the fourth lens group and the fifth lens group for magnification change.

In the lens arrangement of the zoom lens according to the present invention, the lens groups constituting the optical system may further consists of a fixed lens or a fixed lens group in addition to the first lens group to the fourth lens group at closest to the image.

In the lens arrangement of the zoom lens according to the present invention, the second lens group may move to the object side in an infinite object distance to a closest distance in focusing.

Advantages of the Invention

The present invention employing the above lens arrangement can provide a high-power zoom lens achieved downsizing and price reduction at the same time while ensuring high-quality imaging performance.

BRIEF DESCRIPTION OF THE DRAWINGS

FIG. 35 is a table showing numerical values of respective expressions in Examples 1 to 11.

PREFERRED EMBODIMENT OF THE INVENTION

Figure 1:
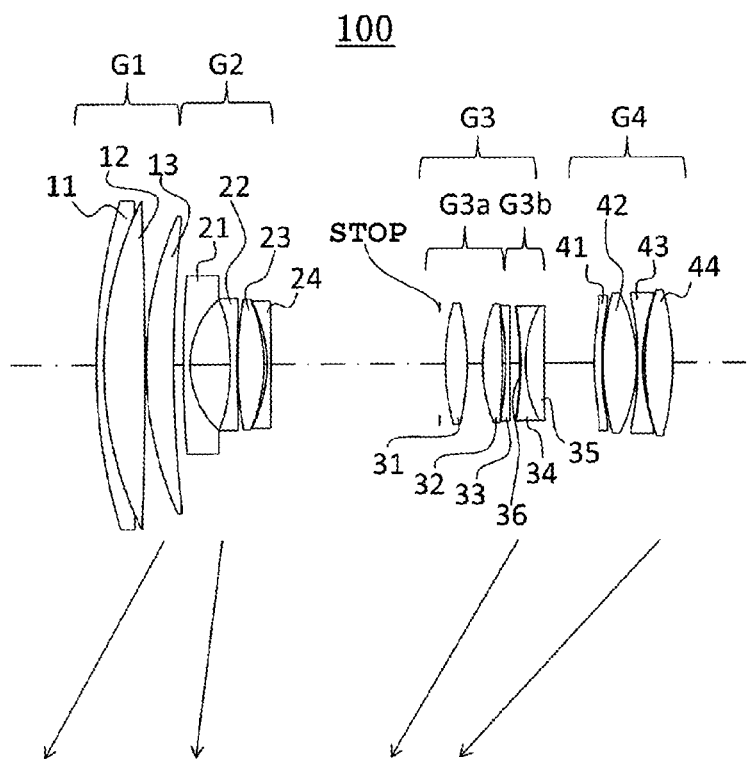
FIG. 1 is a cross-sectional view illustrating a example of the lens arrangement in an optical system according to the present invention, and shows one example of a lens arrangement for infinity focusing at a wide-angle end.

Hereinafter, an embodiment of a zoom lens according to the present invention will be described. FIG. 1 exemplifies a lens arrangement in the optical system 100 of the zoom lens according to the present invention. FIG. 1 shows the zoom lens consists of a first lens group G1 having a positive refractive power, the second lens group G2 having a negative refractive power, the third lens group G3 having a positive refractive power, and the fourth lens group G4 having a positive refractive power arranged in this order from an object side to constitute the optical system 100, and all the lens groups constituting the optical system 100 move along an optical axis direction for adjustment of distance between the respective lens groups to achieve a predetermined magnification change.

1. Example of Lens Arrangement in Optical System for Zoom Lens

First, a lens arrangement in each lens groups constituting the optical system 100 will be described with reference to FIG. 1. Note that the optical system of the zoom lens according to the present invention is not limited to the optical system 100 illustrated in FIG. 1, and the number of lens groups and the specific lens arrangement are not particularly limited as long as the optical system consists of the first lens group G1 to the fourth lens group G4 described above and satisfies various expressions including expressions (1) and (2) described later. For example, the optical system of the zoom lens according to the present invention may further be arranged another lens group such as the fifth lens group and the sixth lens group next to the fourth lens group G4 in addition to the first lens group G1 to the fourth lens group G4, or may consists of a fixed lens or a fixed lens group at closest to the image among the lens groups constituting the optical system as described later. Therefore, the optical system 100 may be changed as appropriate without departing from the scope of the present invention.

First, the first lens group G1 will be described. In the present invention, as long as the first lens group G1 has a positive refractive power as a whole, the specific lens arrangement is not particularly limited. For example, as illustrated in FIG. 1, the first lens group G1 may consist of three lenses: the negative lens 11 provided with a convex surface at the object side, the positive lens 12, and the positive lens 13 provided with a convex surface at the object side arranged in this order from the object side. The positive lens may be further arranged at closest to the image in addition to the three lenses. Note that the number of lenses constituting the first lens group is preferable to be a minimum number necessary to achieve required optical performance in view of downsizing and cost reduction of the zoom lens. The same applies to the other lens groups.

The second lens group G2 consists of the negative meniscus lens 21 arranged at closest to the object and provided with a convex surface at the object side, the negative lens 22 arranged next to the negative meniscus lens 21, and the negative lens 24 arranged at closest to the image and provided with a concave surface at the object side. As long as the second lens group G2 consists of the three lenses, the second lens group G2 may also be arranged another lens according to needs. For example, the second lens group G2 illustrated in FIG. 1 consists of four lenses and the positive lens 23 provided with convex surfaces at both sides is provided between the negative lens 22 arranged at a second position from the object side and the negative lens 24 arranged at closest to the image. In the optical system 100 illustrated in FIG. 1, the second lens group G2 functions as a focusing lens, and the second lens group G2 moves from an infinite distance to the closest distance of the object for focusing. In the present invention, when the lenses constituting the second lens group G2 and the fourth lens group G4 satisfy prescribed expressions, the object of the present invention is achieved and various advantages can be obtained. The expressions will be described later.

Note that in the present invention, "the negative lens 22 arranged next to the negative meniscus lens 21" is "the negative lens 22" arranged "next to" the negative meniscus lens 21 arranged at closest to the object. That is, the positive lens may be arranged between the negative meniscus lens 21 arranged at closest to the object and the negative lens 22 arranged next thereto illustrated in FIG. 1. For example, the positive lens provided with a convex surface at an image side may be arranged between the negative lenses 21 and 22.

As long as the third lens group G3 has a positive refractive power as a whole, the specific lens arrangement is not particularly limited. As illustrated in FIG. 1, lens arrangement in the third lens group G3 may consists of the group 3a (G3a) having a positive refractive power and the group 3b (G3b) having a negative refractive power, and the group 3b may shift in the direction perpendicular to the optical axis for vibration compensation, for example.

For example, the group 3a may consists of three lenses: the positive lens 31 provided with convex surfaces at both sides, the positive lens 32 provided with convex surfaces at both sides, and the negative meniscus lens 33 arranged in this order from the object side. In this lens arrangement, in the positive lens 32 arranged at a second position from the object side and provided with the convex surfaces on both sides, the surface at the object side is preferable to have a smaller curvature radius than that of the surface at the image side. The third lens group is a portion particularly exhibiting a relatively strong positive refractive action at a wide-angle end, and corrects over-spherical aberration generates in the second lens group toward under-spherical aberration. In this lens arrangement, excessive correction toward the under-spherical aberration can be hindered by making curvature radius of the surface at the object side smaller than that of the surface at the image side in the positive lens 32 arranged at the second position from the object side. Moreover, when curvature radius of the surface at the object side is made smaller to provide a wide air space between the positive lens 31 arranged at closest to the object and the positive lens 32 arranged at the second position and further an air lens between the positive lens 32 and the negative lens 33 is made appropriate in refractive power, the spherical aberration can be corrected more favorably, and imaging performance can be further improved not only at the wide-angle end but also over an entire zooming range. In the group 3a, another positive lens may be further arranged between the positive lens 31 arranged at closest to the object and the positive lens 32 arranged next thereto. The specific lens arrangement in the group 3a may be appropriately changed according to the lens arrangement in the group 3b and the lens arrangements of the other lens groups.

The group 3b may be a cemented lens in which the negative lens 34 provided with concave surfaces at both sides and the positive meniscus lens 35 provided with a convex surface at the object side are cemented to each other as illustrated in FIG. 1. The aspherical layer 36 made of a synthetic resin material is also preferable to be arranged on the surface at the object side of the cemented lens which is the concave surface at the object side of the negative lens 34. As described above, the group 3b shifts in the direction perpendicular to the optical axis for vibration compensation. Therefore, a moving mechanism that shifts the group 3b in the direction perpendicular to the optical axis is installed in a lens barrel. By arranging the lenses in the group 3a as described above, the group 3b can be composed of lenses having a small lens diameter because the exit beam height of an Fno beam (a beam contacting an iris among a light beam concentrated on the optical axis) from the group 3a can be reduced particularly at a telescope end. Therefore, increase in the diameter of the lens barrel can be hindered even when the moving mechanism that shifts the group 3b in the direction perpendicular to the optical axis is installed in the lens barrel. By employing the cemented lens, the assembly accuracy of the group 3b can be improved as compared to a lens arrangement in which the respective lenses separates from each other. Also, by employing the cemented lens, weight of the group 3b as a vibration-compensation lens group reduces because the edge shape of the positive meniscus lens 35 can be made thinner. Consequently, a load applied on a vibration-compensation actuator for moving the vibration-compensation lens group can be reduced, and preferable operation control of the vibration-compensation lens group can be achieved.

Next, the fourth lens group G4 will be described. In the present invention, as long as the fourth lens group G4 consists of at least two positive lenses and one negative lens and performs a positive refractive power as a whole, the lens arrangement in the fourth lens group G4 may be arranged other lenses according to needs. For example, the fourth lens group G4 illustrated in FIG. 1 consists of an aspherical lens having a weak refractive power at closest to the object in addition to two positive lenses and one negative lens. Specifically, the fourth lens group G4 illustrated in FIG. 1 consists of an aspherical lens (meniscus lens) 41 having a weak positive refractive power, the positive lens 42 provided with convex surfaces at both sides, the negative lens 43 provided with concave surfaces at both sides and the positive lens 44 provided with convex surfaces at both sides arranged in this order from the object side. The aspherical lens 41 illustrated in FIG. 1 is a positive meniscus lens made of a resin material provided with aspherical surfaces on respective surfaces at the object side and the image side. Arrangement of the aspherical lens at closest to the object in the fourth lens group G4 is preferable for correction of aberrations including distortion aberration well with a small number of lenses to achieve the compact zoom lens.

When the zoom lens is a so-called four group arrangement of positive group preceding type as illustrated in FIG. 1, two positive lenses and one negative lens described above in the fourth lens group G4 are preferable to be arranged in the order of the positive lens 42, the negative lens 43, and the positive lens 44 from the object side as illustrated in FIG. 1. In this lens arrangement, the lens diameter of the last lens can be reduced because the beam height of a light entering the last lens can be reduced by the negative lens 43 arranged between two positive lenses 42 and 44. Note that the lenses may be also arranged in the order of the positive lens, the positive lens, and the negative lens in this order from the object side in the fourth lens group G4. Even when the lenses are arranged in the order of the positive, positive, and negative, the lens diameter of the last lens can be also reduced. However, when the lenses are arranged in the order of the positive, positive, and negative, a peripheral light intensity hardly ensured because of a short back focus and a steep beam incident angle into an imaging surface of a maximum image height. In the fourth lens group G4, the lenses may be also arranged in the order of the negative lens, the positive lens, and the positive lens in this order from the object side. However, aberration correction is made difficult in this lens arrangement. Therefore, in the lens arrangement in which the zoom lens is the so-called four group arrangement of positive group preceding type as illustrated in FIG. 1, it is preferable that at least two positive lenses and one negative lens constituting the fourth lens group are arranged in the order of the positive lens, the negative lens and the positive lens in this order from the object side. Note that it is more preferable that the aspherical lens having a weak refractive power is arranged at closest to the object in addition to the three lenses in the fourth lens group G4.

The zoom lens according to the present invention is the positive-group preceding type consists of at least the four lens groups from the first lens group G1 to the fourth lens group G4 as the lens groups constituting the optical system 100 and the first lens group G1 has a positive refractive power as illustrated in FIG. 1. When the zoom lens of positive-group preceding type is employed, high imaging performance can be achieved in a high-power zoom lens. Further, a high magnification change zoom ratio can be efficiently ensured and less optical total length can be achieved by making all the lens groups constituting the optical system 100 move for magnification change.

Here, in the zoom lens according to the present invention, it is preferable that the lens groups move from the wide-angle end to the telescope end for magnification change to make distance between the first lens group G1 and the second lens group G2 increase, distance between the second lens group G2 and the third lens group G3 decrease, and distance between the third lens group G3 and the fourth lens group G4 decrease. A high magnification change ratio can be achieved with a small amount travel of lens by making the respective lens groups move as described above. That is, a high-power zoom lens with a high magnification change of more than 10 can be constructed in compact, and various aberration corrections can be favorably achieved.

When the groups 3a and 3b constituting the third lens group G3 are integrally moved for magnification change, the third lens group G3 moves as described above. When the groups 3a and 3b separately and independently move for magnification change, the respective groups move to make distance between the second lens group G2 and the group 3a decrease, distance between the group 3a and the group 3b change, and distance between the group 3b and the fourth lens group G4 decrease. When the optical system 100 of the zoom lens is arranged the fifth lens group that moves independently from the first lens group G1 to the fourth lens group G4 illustrated in FIG. 1 in addition to the first lens group G1 to the fourth lens group G4, the respective lens groups move to make the distance between the second lens group G2 and the third lens group G3 decrease, the distance between the third lens group G3 and the fourth lens group G4 decrease and distance between the fourth lens group G4 and the fifth lens group increase. Note that the third lens group G3 consists of the groups 3a and 3b has been exemplified in the present embodiment, the matter is sure that the group 3a may be referred to as third lens group, the group 3b may be referred to as fourth lens group, and the fourth lens group G4 may be referred to as fifth lens group when the lens groups separately and independently move for magnification change.

Further as described above, the optical system 100 of the zoom lens according to the present invention may further be arranged a fixed lens or a fixed lens group at closest to the image in the optical system 100 in addition to the first lens group G1 to the fourth lens group G4 described above. For example, the positive or negative fixed lens or fixed lens group having a weak refractive power may be arranged. Even when the fixed lens or fixed lens group is arranged at closest to the image in the optical system 100, the advantages of the zoom lens according to the present invention are not damaged.

2. Expressions (1) to (7)

In the present invention, the compact zoom lens with reduced price is achieved by employing the present optical system 100, and specifically, satisfying the following expressions including expressions (1) and (2) for the lenses constituting the second lens group G2 and the fourth lens group G4. In the following, the expressions (1) and (2), and further expressions (3) to (7) will be described.

2-1. Expressions (1) and (2)

The zoom lens according to the present invention is characterized in that the negative lens 22 arranged next to the negative meniscus lens 21 arranged at closest to the object among the lenses constituting the second lens group G2, and the lens 41 arranged at closest to the object among the lenses constituting the fourth lens group G4 satisfy the expressions (1) and (2).

[Expression 7]

$$1.48 \leq (NV+NL)/2 \leq 1.62 \quad (1)$$

$$38 \leq (VV+VL)/2 \leq 62 \quad (2)$$

in the expressions (1) and (2);
NV: Refractive index for a d-line of the negative lens in the second lens group arranged next to the negative meniscus lens
VV: Abbe number of the negative lens in the second lens group arranged next to the negative meniscus lens
NL: Refractive index for a d-line of the lens in the fourth lens group arranged at closest to the object
VL: Abbe number of the lens in the fourth lens group arranged at the closest to the object.

The expression (1) relates to the lens material constituting the second lens group G2 and the fourth lens group G4. The expression (2) relates to the lens material for ensuring preferable imaging performance in the optical system 100. The material satisfying both of the expressions (1) and (2) is limited to a resin material at the moment. Therefore, a resin lens is employed into the second lens group G2 and the fourth lens group G4 in the present invention to reduce both cost and weight of the zoom lens as compared to a lens arrangement in which all of the lenses are made of glass.

Note that, as the resin lens is easily influenced by fluctuation of the environment such as temperature and humidity, the shape change of the lens surface due to the environmental change may affect on the imaging performance. Thus, it must be paid attention that the resin lens should be arranged at a position hardly affected by the environmental change when the resin lens is employed into the second lens group G2. In addition, as the resin lens has a lower refractive index than that of the lens made of glass material, shape change in the lens surface including decreased curvature radius and increased lens diameter is necessary to achieve a refractive power equal to that of the glass lens. Thus, when the resin lens is employed into the second lens group G2, the diameter of a filter may increase due to the shape change in the lens surface. Therefore, the matter should be noted that the resin lens should be arranged in consideration of hindrance of the increase in the filter diameter. The matter should be also paid attention that the resin lens is preferable to be arranged at a position where a movement load in the travel of the lens groups can be reduced.

Based on the above three points to be paid attention, the resin lens satisfying the expressions (1) and (2) is employed as the negative lens 22 arranged next to the negative meniscus lens 21 arranged at closest to the object among the lenses constituting the second lens group G2 in the present invention. The influence on the resin lens due to the environmental change can be hindered by employing the resin lens as the negative lens 22 arranged at the second or subsequent position from the object side among the lenses constituting the second lens group G2. When the resin lens is employed, the lens diameter of the negative lens 22 increases a little. However, increase in the lens diameter of the negative lens 22 (the resin lens) can be hindered and the entire refractive power can be made appropriate by arranging the negative meniscus lens 21 at closest to the object among the lenses constituting the second lens group G2 and optimizing the shape of the lens surface and the refractive power or the like of the negative meniscus lens 21. When the resin lens is employed as the negative lens 22, the lens (21) having a strong refractive power is arranged at closest to the object. Thus, an entrance pupil position can be arranged closer to the object at the wide-angle side. As the front lens diameter decreases to decrease the filter diameter, the compact zoom lens can be achieved. By employing the resin lens into the second lens group G2, weight of the second lens group G2 also reduces to preferably reduce operating load in focusing.

Moreover, by employing the resin lens as the lens 41 arranged at closest to the object among the lenses constituting the fourth lens group G4 also, reduction in both weight and cost of the zoom lens can be achieved in the present invention.

The reason why expression (1) is employed is as follows. When the average value [(NV+NL)/2] of the refractive indexes of the resin lenses employed into the second lens group G2 and the fourth lens group G4 is within the range specified in the expression (1), the imaging performance required for the zoom lens can be ensured and the lens can be also manufactured at low cost by using a commercially-available resin material to reduce manufacturing cost. Further, increase in the size of the zoom lens can be hindered.

When the average value of the refractive indexes of the resin lenses [(NV+NL)/2] exceeds 1.62 (upper limit), a refractive power for a light beam at the lens surface is made too strong level not acceptable because a micro error in shape at the lens surface generated in lens work affects on aberration. That is, too strong refractive power of the lens surface is not preferable because it makes difficult to obtain high-quality imaging performance. For example, when a thermosetting resin lens represented by a lens for eyeglasses is employed into the second lens group G2 and/or the fourth lens group G4, the average value [(NV+NL)/2] of the refractive indexes of the resin lenses may exceed 1.62. Although such thermosetting resin lens has a high refractive index, inject-molding is difficult. So, the matter is not preferable from the viewpoint of achieving cost reduction because working cost for the lens not to generate the micro error in shape at the lens surface described above increases. When the micro error in shape generates at the lens surface, the aberration is affected as described above. Furthermore, as the thermosetting resin lens is low in transmittance and color represented by a CCI value or the like is shifted toward yellow, it is not preferable because level of the imaging performance required for the zoom lens cannot be maintained.

On the other hand, the average value of the refractive indexes of the resin lens [(NV+NL)/2] of less than 1.48 (lower limit) is not preferable because the refractive powers of the respective lens groups is made weak to result increased size of the zoom lens or poor imaging performance even when the other lenses constituting the respective lens groups are optimized. Details are as follows. When the average value [(NV+NL)/2] is less than 1.48, weak refractive power of the negative lens 22 due to the decrease in the refractive index may be compensated by adjusting the refractive power of the negative meniscus lens 21 arranged at closest to the object among the lenses constituting the second lens group G2. In this lens arrangement, the refractive power is generally increased by decreasing the curvature radius of the surface at the image side of the negative meniscus lens 21. When the refractive power is adjusted in such a way, astigmatism aberration at the telescope end worsens in particular. To improve the decline in the astigmatism aberration, the lens surface of the negative lens 22 should be formed in an aspherical shape. However, the aspherical shape is hardly finished to be a shape composed of smoothly-connected points, but the shape may have an inflection point near the effective aperture in such a lens arrangement. Thus, it is not preferable because of difficulty in lens surface work. Further, when the refractive power of the negative meniscus lens 21 increases, difficulty arises in ensuring of a peripheral light intensity from an intermediate focal length to the telescope end. As the lens diameter should be increased to ensure the peripheral light intensity, the matter is not preferable because the filter diameter increases and size of the zoom lens increases.

On the other hand, the refractive power of the fourth lens group G4 is relatively weak in the optical system 100. Thus, even when the average value of the refractive indexes [(NV+NL)/2] is less than 1.48, the size and the imaging performance of the lens are not largely affected. However, the shape change of the lens surface to compensate decrease in the refractive power synchronizing to the decrease in the refractive index is not preferable because the imaging performance worsens beyond an acceptable range due to the shape change in the lens surface.

From the viewpoint of making the zoom lens more compact and ensuring higher-quality imaging performance, the value of [(NV+NL)/2] is more preferable to satisfy 1.5≤[(NV+NL)/2]≤1.6, and further preferable to satisfy 1.52≤[(NV+NL)/2]≤1.58 in the expression (1).

Further, when the average value of the Abbe numbers [(VV+VL)/2] of the resin lenses employed into the second lens group G2 and the fourth lens group G4 satisfies the expression (2), the high-quality imaging performance required for the optical system 100 can be ensured as described above. On the other hand, the average value of the Abbe numbers [(VV+VL)/2] exceeds 62 (upper limit) is not preferable because magnification chromatic aberration worsens due to magnification change, and the preferable imaging performance may not be ensured. When a resin lens made of a commercially-available resin material is employed into the second lens group G2 and/or the fourth lens group G4, a resin lens made of the material having average value of the Abbe numbers [(VV+VL)/2] of 62 or more is not preferable because transmittance is low and the CCI value also worsens not to ensure the preferable imaging performance. Next, the average value of the Abbe numbers [(VV+VL)/2] of less than 38 (lower limit) is not preferable because the resin lenses are small in Abbe number and high in chromatic dispersion value and the magnification chromatic aberration due to magnification change worsens not to ensure preferable imaging performance.

From the viewpoint of making the zoom lens more compact, and ensuring higher-quality imaging performance, the value of [(VV+VL)/2] in the expression (2) is more preferable to satisfy 40≤[(VV+VL)/2]≤60 and further preferable to satisfy 42≤[(VV+VL)/2]≤59.

2-2. Expression (3)

In the zoom lens according to the present invention, the focal lengths of the negative meniscus lens 21 arranged at closest to the object and the negative lens 22 arranged next to the negative meniscus lens 21 among the lenses constituting the second lens group G2 are preferable to satisfy the following expression (3).

[Expression 8]

$$1.6 \leq f22/f21 \leq 3.4 \quad (3)$$

in the expression (3);

f21: Focal length of the negative meniscus lens in the second lens group arranged at closest to the object f22: Focal length of the negative lens in the second lens group arranged next to the negative meniscus lens.

The expression (3) represents the proportion (ratio) between the refractive powers of two negative lenses 21 and 22 arranged in this order from the object side among the lenses constituting the second lens group G2. When the proportion of the refractive powers [f22/f21] exceeds 3.4 (upper limit), the refractive power of the negative lens 22 arranged next to the negative meniscus lens 21 is judged weak relative to the refractive power of the negative meniscus lens 21 arranged at closest to the object. In this lens arrangement, as the refractive power of the negative meniscus lens 21 arranged at closest to the object can be made strong, the effect to make filter diameter small is achieved. However, when the refractive power of the negative meniscus lens 21 is made strong, interference with the lens (22) arranged on the image side of the negative meniscus lens 21 should be avoided because the curvature radius of the surface at the image side decreases. This lens arrangement is not preferable because distance between two lenses 21 (22) should increase and filter diameter increases.

On the other hand, when the proportion of the refractive powers [f22/f21] is less than 1.6 (lower limit), the refractive power of the negative lens 22 arranged next to the negative meniscus lens 21 is judged strong relative to the refractive power of the negative meniscus lens 21 arranged at closest to the object. This lens arrangement is not preferable because the distortion aberration worsens particularly at the wide-angle end.

From the viewpoint of making the zoom lens more compact and ensuring higher-quality imaging performance, the value of [f22/f21] in the expression (3) is more preferable to satisfy 1.7≤[f22/f21]≤3.3 and further preferable to satisfy 1.8≤[f22/f21]≤3.2.

2-3. Expression (4)

In the preset invention, the lens 41 arranged at closest to the object among the lenses constituting the fourth lens group G4 is an aspherical lens provided with aspherical surfaces at both sides, and is preferable to satisfy the following expression (4).

[Expression 9]

$$2.9 \leq |fp/f4| \leq 19.5 \quad (4)$$

in the expression (4);

f4: Focal length of the fourth lens group fp: Focal length of the lens in the fourth lens group arranged at closest to the object.

The expression (4) represents the proportion of the refractive powers of the lenses constituting the fourth lens group G4. When the high-power zoom lens consists of the first lens group G1 having a positive refractive power, the second lens group G2 having a negative refractive power and the third lens group G3 having a positive refractive power in this order from the object side as the lens groups constituting the optical system 100, employing of the aspherical lens as at least one of the lenses constituting the fourth lens group G4 is important to ensure the high-quality imaging performance. However, the required imaging performance may not be obtained by only arranging the aspherical lens in the fourth lens group G4. Therefore, the matters are extremely important issue to ensure the high-quality imaging performance how the fourth lens group G4 is constructed and where the aspherical lens is arranged.

Thus, higher-quality imaging performance can be achieved in the zoom lens according to the present invention through;

at least two positive lenses and one negative lens constitute the fourth lens group G4 as described above, the lens 41 arranged at closest to the object is the resin lens satisfying the expressions (1) and (2) and the double-sided aspherical lens satisfies the expression (4). Since the resin lens is employed as the lens 41 arranged at closest to the object among the lenses constituting the fourth lens group G4 in the present invention, the lens 41 can be obtained at lower cost than the lens made of glass even though the lens 41 is the double-sided aspherical lens, i.e. the price is reduced while maintaining the level of the imaging performance of the zoom lens.

The value of [|fp/f4|] exceeding 19.5 (upper limit) is not preferable because the refractive power of the aspherical lens (the lens 41) is judged too weak and make prevention of imaging performance due to an assembly error by aligned assembling of the aspherical lens difficult, in particular, correction of a curvature at image side. As the refractive power of the aspherical lens is highly correlated with the curvature at image side due to decentration, the decline of imaging performance can be prevented by the aligned assembling of the aspherical lens along optical axis when the value of [|fp/f4|] is within the range of the expression (4) even when the imaging performance may worsen due to an assembly error. On the other hand, the value of [|fp/f4|] of less than 2.9 (lower limit) is not preferable because the refractive power of the aspherical lens is judged strong and off-axis upper light beam is insufficiently or excessively corrected particularly at the wide-angle end not to achieve the high imaging performance.

As in the present embodiment, the fourth lens group G4 is preferable to consist of the four lenses: the double-sided aspherical lens 41, the positive lens 42, the negative lens 43 and the positive lens 44 in this order from the object side. Therefore, well imaging performance can be achieved, and minimum number of lenses required for aberration correction achieves reduction in size and manufacturing cost of the zoom lens.

In the present invention, all the lenses constituting the fourth lens group G4 are preferably arranged independently without using a cemented lens. By arranging all the lenses independently, as the shape of the lens surface of each lens is made free, an air lens formed by increasing distance between the respective lenses can be utilized and the refractive power can be easily adjusted. Note that when the cemented lens is used, even the decentration due to an assembly error is less likely to occur but adjustment of the refractive power is made difficult because the shape of the lens surface of the cemented lens is restricted. On the other hand, when all the lenses are arranged independently without using the cemented lens, an assembly error may occur. However, in the present invention, the lens diameter slightly increases as compared to a lens arrangement in which only a glass lens is employed because the resin lens is employed as the lens 41 arranged at closest to the object among the lenses constituting the fourth lens group G4. Next, decentration sensitivity can be reduced by the increased lens diameter of the lens 41 arranged at closest to the object to hinder influences on the imaging performance due to the assembly error because the refractive power of the fourth lens group G4 is relatively weak. Further, as all the lenses are independently arranged, the decline in the imaging performance due to the assembly error can be corrected by the aligned assembling of the aspherical lens as described above.

From the viewpoint to make the zoom lens more compact and ensure higher-quality imaging performance, value of |fp/f4| in the expression (4) indicating relationship of the refractive power of the aspherical lens is more preferable to satisfy $3.0 \leq [|fp/f4|] \leq 19.3$ and further preferable to satisfy $3.1 \leq [|fp/f4|] \leq 19$.

2-4. Expression (5)

In the zoom lens according to the present invention, the negative lens 22 arranged next to the negative meniscus lens 21 arranged at closest to the object in the second lens group G2 is preferable to be provided with an aspherical surface at least on an image side and satisfies the following expression (5).

[Expression 10]

$$-0.07 \leq \Delta2/f2 \leq 0.07 \qquad (5)$$

In the expression (5);

Δ2: Deformation amount of the aspherical surface relative to the base spherical surface from the optical axis to the effective radial position.

When the aspherical lens is arranged in the second lens group G2, a high correction effect particularly for the distortion aberration can be achieved, and the high-quality imaging performance can be achieved. When only the distortion aberration correction effect is taken into consideration, the aspherical lens is preferable to be arranged at closest to the object among the lenses constituting the second lens group G2. However, in the present invention, the aspherical lens provided with the aspherical surface at the image side that satisfies the expression (5) is employed as the negative lens 22 arranged next to the negative meniscus lens 21 that is arranged at closest to the object among the lenses constituting the second lens group G2. Therefore, even the distortion aberration correction effect is made poor when viewed only from the viewpoint of the arrangement of the aspherical lens in the second lens group G2, the distortion aberration can be appropriately corrected by interaction between the aspherical lens arranged in the second lens group G2 which satisfies the expression (5) and the aspherical lens arranged in the fourth lens group G4 when the aspherical lens is employed into the fourth lens group G4 as described above. In the present invention, the aspherical lens can be obtained at low cost because the resin lens is employed as the negative lens 22. Moreover, an off-axis light beam can be effectively corrected over an entire zoom range to achieve high imaging performance because the expression (5) is satisfied.

The deformation amount of aspherical surface relative to the base spherical surface of the aspherical lens (the negative lens 22) exceeding upper limit in the expression (5) is not preferable because the curvature of field falls to the underside particularly at the intermediate focal length and results insufficient correction. On the other hand, the deformation amount of aspherical surface relative to the base spherical surface of less than lower limit in the expression (5) is not preferable because difference between the curvatures of fields at the wide-angle end and the telescope end significantly increases and the difference is hardly corrected through adjustment of the travel distances of the other lens groups.

From the viewpoint to make the zoom lens more compact and to ensure higher-quality imaging performance, the value of Δ2/f2 in the expression (5) is more preferable to satisfy $-0.065 \leq [\Delta2/f2] \leq 0.065$, and further preferable to satisfy $-0.06 \leq [\Delta2/f2] \leq 0.06$.

2-5. Expression (6)

In the present invention, the value of [f123t/f4*Z] indicating a relationship between the focal length and the zoom ratio (magnification change ratio) of each of the lens groups constituting the optical system 100 is preferable to satisfy the following expression (6).

[Expression 11]

$$-44 \leq f123t/f4 \times Z \leq -23 \qquad (6)$$

in the expression (6);

f123t: Synthetic focal length of the first lens group to the third lens group at a telescope end
f4: Focal length of the fourth lens group
Z: Zoom ratio ([a focal length at the telescope end]/[a focal length at a wide-angle end]).

The expression (6) specifies a value obtained by multiplying the zoom ratio (magnification change ratio) to the ratio between the synthetic focal length of the first lens group G1 to the third lens group G3 at the telescope end and the focal length of the fourth lens group G4. A high magnification change factor can be achieved by making the focal length of the fourth lens group G4 set within an appropriate range satisfying the expression (6) against the synthetic focal length of the first lens group G1 to the third lens group G3 at the telescope end. Such lens arrangement is preferable from the viewpoint of cost reduction and downsizing because minimum number of lenses for aberration correction constitutes the fourth lens group G4. The fourth lens group G4 can be compactly constituted by the four lenses as illustrated in FIG. 1, for example.

Next, the value exceeding upper limit in the expression (6) is not preferable because the refractive power of the fourth lens group G4 is made strong and the number of lenses required for constituting the fourth lens group G4 increases, manufacturing cost increases and total length of the optical system 100 of the zoom lens increases also. Such lens arrangement is not preferable also because as the decentration sensitivity of the curvature of field is high, extremely high accuracy is required in assembly and manufacturing of the optical system 100 having the high imaging performance with a good yield is made difficult. On the other hand, the value of less than lower limit in the expression (6) is not preferable because the refractive power of the fourth lens group G4 is made weak and the travel distance of the fourth lens group G4 for magnification change increases and the matter requires long total length of the lens barrel to hinder downsizing of the zoom lens.

From the viewpoint to make the zoom lens more compact and to ensure higher-quality imaging performance, the value of [f123t/f4*Z] in the expression (6) indicating the relationship between the focal length and the zoom ratio (magnification change ratio) of each of the lens groups constituting the optical system 100 is more preferable to satisfy $-43 \leq [f123t/f4*Z] \leq -24$, and further preferable to satisfy $-42 \leq [f123t/f4*Z] \leq -25$.

2-6. Expression (7)

In the zoom lens according to the present invention, a relationship between the travel distance (M1) of the first lens group G1 and the travel distance (M2) of the second lens group G2 is preferable to satisfy the following expression (7).

[Expression 12]

$$0.21 \leq |M2/M1| \leq 0.42 \quad (7)$$

in the expression (7);
M1: Travel distance of the first lens group from the wide-angle end to the telescope end (travel distance to the object side is positive)
M2: Travel distance of the second lens group from the wide-angle end to the telescope end (travel distance to the object side is positive).

The expression (7) defines the ratio between the travel distances of the first lens group G1 and the second lens group G2 from the wide-angle end to the telescope end. In the optical system 100 of the zoom lens according to the present invention, the first lens group G1 and the second lens group G2 respectively move to the object side for magnification change from the wide-angle end to the telescope end. In the travel, by making the travel distance of the second lens group G2 smaller than that of the first lens group G1 to make the ratio M2/M1 within the range of the expression (7), a high magnification change ratio can be ensured, travel distances of the respective lens groups can be adjusted to be within a preferable range and total length of the lens barrel can be made compact.

Next, travel distance of the second lens group G2 relatively increased against the travel distance of the first lens group G1 beyond upper limit in the expression (7) is not preferable because total optical length at the telescope end increases. On the other hand, the travel distance of the second lens group G2 of smaller than the travel distance of the first lens group G1 below lower limit in the expression (7) is not preferable because the travel distance of the third lens group G3 or the fourth lens group G4 increase to ensure a high magnification change ratio and when the lens groups are moved by a mechanism for rotating a cam cylinder or the like, the construction of the moving mechanism should be complicated and the size of the lens barrel increases.

From the viewpoint to make the zoom lens more compact and to ensure higher-quality imaging performance, the value of [|M2/M1|] in the expression (7) is more preferable to satisfy $0.22 \leq [|M2/M1|] \leq 0.41$ and further preferable to satisfy $0.23 \leq [|M2/M1|] \leq 0.40$.

Next, the present invention will be specifically demonstrated through examples. Note that the present invention should not be limited to Examples 1 to 9 described below. In Examples 1 to 9, specific numerical data examples obtained when the zoom lens according to the present invention was used in a digital single-lens reflex camera will be described.

Example 1

First, the zoom lens in Example 1 will be described. The zoom lens in Example 1 has the same lens arrangement as that of the optical system 100 (see FIG. 1). That is, the zoom lens in Example 1 consists of the first lens group G1 having a positive refractive power, the second lens group G2 having a negative refractive power, the third lens group G3 having a positive refractive power and the fourth lens group G4 having a positive refractive power arranged in this order from the object side as the lens groups constituting the optical system 100. As described above, the second lens group G2 is a focusing lens group that moves in focusing. Focusing of object from an infinite distance to a closest distance is performed by moving the second lens group G2 to the object side in focusing. In FIG. 1, the symbol STOP denotes an iris. In zooming from the wide-angle end to the telescope end, the respective lens groups travel forward and backward along the optical axis to change distance between the lens groups. The travel directions of the respective lens groups and the changes in the distance between the respective lens groups are schematically indicated by arrows in FIG. 1.

The first lens group G1 (surface numbers 1 to 5) consists of a cemented lens in which the negative meniscus lens 11 provided with the convex surface at the object side and the double-sided convex positive lens 12 are cemented and the positive meniscus lens 13 provided with the convex surface at the object side arranged in this order from the object side. The surface number indicates a number given to the respective surfaces of the lenses constituting the optical system 100 in this order from the object side. One surface number is given to the cemented surface.

The second lens group G2 (surface numbers 6 to 13) consists of the negative meniscus lens 21 provided with the convex surface at the object side, the double-sided concave negative lens 22, the double-sided convex positive lens 23 and the negative meniscus lens 24 provided with the convex surface at the image side arranged in this order from the object side. In the second lens group G2, the double-sided concave negative lens 22 arranged at the second position from the object side is the resin lens, and is also the double-sided aspherical lens provided with the aspherical surfaces at both sides.

The third lens group G3 (surface numbers 15 to 24) consists of the group 3a (surface numbers 15 to 20) and the group 3b (surface numbers 21 to 24). The group 3a consists of the double-sided convex positive lens 31, the double-sided convex positive lens 32 and the negative meniscus lens 33 in this order from the object side. The group 3b (surface numbers 21 to 24) consists of the cemented lens of the double-sided concave lens 34 and the positive meniscus lens 35. The aspherical layer 36 made of a resin material is cemented to the surface at the object side of the cemented lens. In the present example, the group 3b shifts in the direction perpendicular to the optical axis for the vibration compensation. The shift of the group 3b for the vibration compensation is 0.087 mm, 0.182 mm, and 0.467 mm at the wide-angle end, the intermediate focal length and the telescope end respectively at correction angle of 0.3°.

The iris STOP (surface number 14) is arranged between the second lens group G2 and the third lens group G3. The iris STOP travels integrally with the third lens group G3.

The fourth lens group G4 (surface numbers 25 to 32) consists of the positive meniscus lens 41 having a small refractive power, the double-sided convex positive lens 42, the double-sided concave negative lens 43 and the double-sided convex positive lens 44 in this order from the object side. The positive meniscus lens 41 arranged at closest to the object is the resin lens, and is also the double-sided aspherical lens provided with the aspherical surfaces at both sides.

In the present zoom lens, the groups 3a and 3b constituting the third lens group G3 may be arranged to move independently and the distance between the groups 3a and 3b may change for magnification change. In this lens arrangement, travel of the groups 3a and 3b is preferable to decrease the distance therebetween from the wide-angle end to the telescope end for magnification change to ensure a high magnification change ratio.

Next, the specific numerical data on the respective lenses constituting the optical system 100 in Example 1 is shown in Tables 1 to 3. Table 1 shows the surface data on the respective lens surfaces. In Table 1, "No" is the surface number of the lens surface, "R" is the curvature radius of the lens surface, "D" is distance to the next lens surface, i.e. the thickness of a lens or distance between lenses. "Nd" is the refractive index for a d-line and "ABV" is the Abbe number. Next, ASPH indicates that the lens surface is aspherical. The same applies to Tables 4, 7, 10, 13, 16, 19, 22, 25, 28, and 31.

Table 2 shows the data relating to a focal length (F), F number (Fno), a half field angle (W) (°), and a distances between lenses (D(5), D(13), D(24) and D(32)) that changes depending on magnification change. The respective data is described in the order from the wide-angle end, the intermediate focal length and the telescope end. The same applies to Tables 5, 8, 11, 14, 17, 20, 23, 26, 29, and 32.

Moreover, Table 3 shows the aspherical data at the respective lens surfaces. "No." indicates the surface number of the lens surface. A conical coefficient K and aspherical coefficients A4, A6, A8 and A10 in respective degrees when a rotationally-symmetrical aspherical surface is specified by the following expression for each of the lens surfaces are shown in Table 3. Note that "E-a" indicates "*$10^{-a}$". The same applies to Tables 6, 9, 12, 15, 18, 21, 24, 27, 30, and 33.

$$x=cy2/[1+[1-(1+K)c2y2]½]+A4y4+A6y6+A8y8+A10y10+A12y12 \text{ and so on}$$

(wherein: c indicates a curvature radius (1/R), y indicates a height from the optical axis, K indicates a conical coefficient, and A4, A6, A8 and so on indicate aspherical coefficients of respective degrees)

Figure 2:
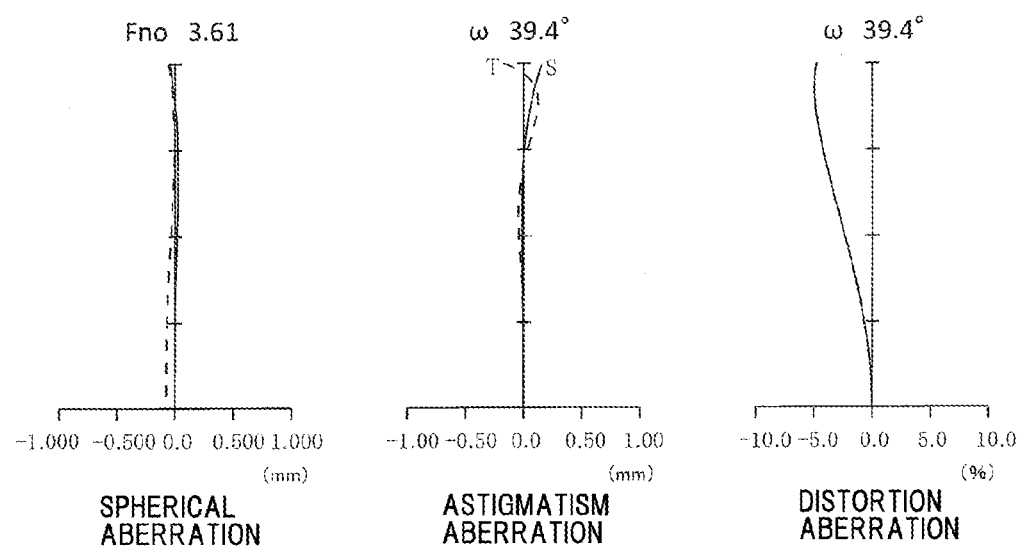
FIG. 2 is an aberration diagram (spherical aberration, astigmatism aberration, and distortion aberration; the same applies in FIGS. 3 to 28 below) at a zoom wide-angle end of the zoom lens in Example 1.
Figure 3:
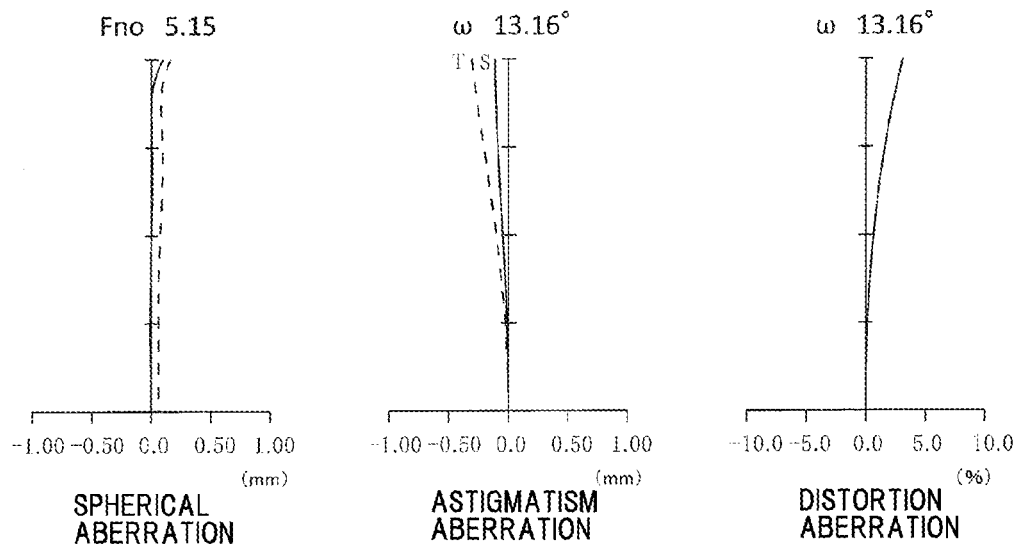
FIG. 3 is an aberration diagram at a zoom intermediate focal point of the zoom lens in Example 1.
Figure 4:
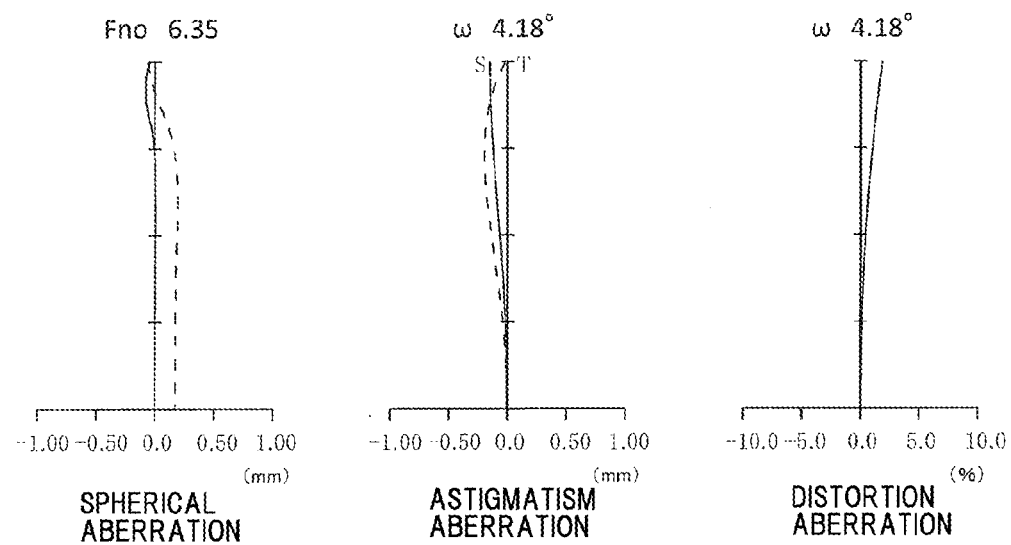
FIG. 4 is an aberration diagram at a zoom telescope end of the zoom lens in Example 1.

FIG. 1 is a lens arrangement in infinity focusing at the wide-angle end in Example 1. FIG. 2 is a longitudinal aberration diagram at the wide-angle end. FIG. 3 is a longitudinal aberration diagram at the intermediate focal length. FIG. 4 is a longitudinal aberration diagram at the telescope end. Among the respective aberration diagram, a solid line and a dashed line in spherical aberration diagrams indicate a d-line and a g-line, respectively. In astigmatism aberration diagrams, S indicates a sagittal direction, and T indicates a tangential direction. Distortion aberration diagram indicates the distortion aberration of the d-line. The same applies to the following drawings.

Moreover, the numerical values in the respective expressions are shown in FIG. 35. All the examples described below including Example 1 satisfy the respective expressions (1) to (7).

TABLE 1

| No. | R | D | Nd | ABV |
|---|---|---|---|---|
| 1 | 79.2809 | 1.2000 | 1.84666 | 23.78 |
| 2 | 52.5933 | 6.6000 | 1.49700 | 81.61 |
| 3 | −614.1709 | 0.2000 | | |
| 4 | 51.3606 | 4.4000 | 1.51742 | 52.15 |
| 5 | 174.6119 | D(5) | | |
| 6 | 170.7500 | 1.1000 | 1.83481 | 42.72 |
| 7 | 12.7102 | 6.4500 | | |
| 8 ASPH | −29.7960 | 1.0000 | 1.53103 | 58.27 |
| 9 ASPH | 69.1204 | 0.2000 | | |
| 10 | 50.9813 | 4.2000 | 1.80518 | 25.46 |
| 11 | −23.0148 | 0.4500 | | |
| 12 | −19.4291 | 0.7000 | 1.77250 | 49.62 |
| 13 | −433.4039 | D(13) | | |
| 14 STOP | 0.0000 | 0.9000 | | |
| 15 | 30.2112 | 3.5000 | 1.48749 | 70.44 |
| 16 | −37.6753 | 2.5202 | | |
| 17 | 22.4251 | 3.2000 | 1.48749 | 70.44 |
| 18 | −111.3518 | 0.4700 | | |
| 19 | −46.0666 | 0.8000 | 1.84666 | 23.78 |
| 20 | −1662.1485 | 1.5101 | | |
| 21 ASPH | −45.6126 | 0.2000 | 1.51460 | 49.96 |
| 22 | −45.1441 | 0.7000 | 1.83400 | 37.34 |
| 23 | 17.4864 | 3.0000 | 1.80518 | 25.46 |
| 24 | 238.2673 | D(24) | | |
| 25 ASPH | 38.3664 | 1.2000 | 1.53103 | 58.27 |
| 26 ASPH | 43.8962 | 0.2088 | | |
| 27 | 35.4894 | 5.4000 | 1.51680 | 64.20 |
| 28 | −21.7154 | 0.2000 | | |
| 29 | −45.1186 | 0.8000 | 1.90366 | 31.31 |
| 30 | 27.7122 | 0.3300 | | |
| 31 | 32.9835 | 4.5000 | 1.61293 | 37.00 |
| 32 | −37.7350 | D(32) | | |

TABLE 2

| F | 18.5367 | 60.0953 | 194.9328 |
|---|---|---|---|
| Fno | 3.6102 | 5.1533 | 6.3504 |
| W | 39.3985 | 13.1639 | 4.1760 |
| D(5) | 1.5834 | 26.0201 | 47.9967 |
| D(13) | 27.0352 | 11.2267 | 1.8173 |
| D(24) | 8.0484 | 3.4417 | 1.7318 |
| D(32) | 43.6191 | 75.7442 | 97.0219 |

TABLE 3

| No. | K | A4 | A6 | A8 | A10 |
|---|---|---|---|---|---|
| 8 | 0.00000E+00 | −1.65721E−05 | 2.62792E−07 | −4.94483E−09 | 1.96956E−11 |
| 9 | 0.00000E+00 | −5.19679E−05 | 1.86714E−07 | −4.16967E−09 | 1.29125E−11 |
| 21 | 0.00000E+00 | 1.25827E−05 | −5.42177E−08 | 1.41785E−09 | −9.76635E−12 |
| 25 | 0.00000E+00 | 7.34439E−06 | −5.33421E−07 | −4.03799E−09 | 2.33281E−11 |
| 26 | 0.00000E+00 | 4.99364E−05 | −5.43708E−07 | −3.84796E−09 | 2.68169E−11 |

Example 2

Next, Example 2 will be described. Since the optical system 100 of the zoom lens in Example 2 is almost the same in lens arrangement as that in Example 1, only differences including the lens arrangement from those in Example 1 will be described. In the optical system 100 in Example 2, the group 3b among the groups 3a and 3b constituting the third lens group G3 shifts in the direction perpendicular to the optical axis for the vibration compensation. The shift of the group 3b for the vibration compensation is 0.093 mm, 0.191 mm, and 0.503 mm at the wide-angle end, the intermediate focal length and the telescope end respectively at a correction angle of 0.3°. In the present example, the groups 3a and 3b may also independently move along the optical axis direction for magnification change. The travel directions are preferable to be the same directions as those in Example 1. The same applies to Example 3 and following Examples.

Figure 5:
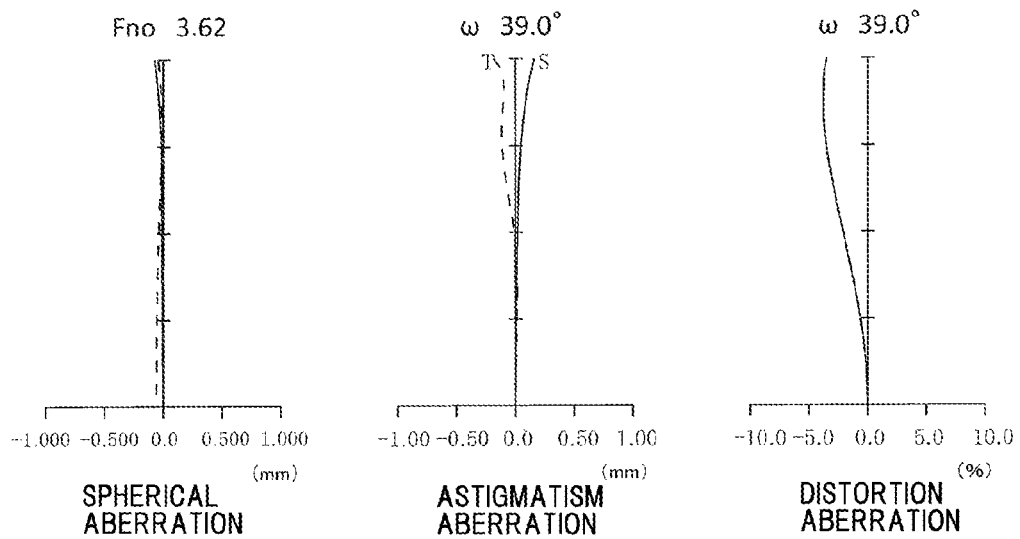
FIG. 5 is an aberration diagram at a zoom wide-angle end of the zoom lens in Example 2.
Figure 6:
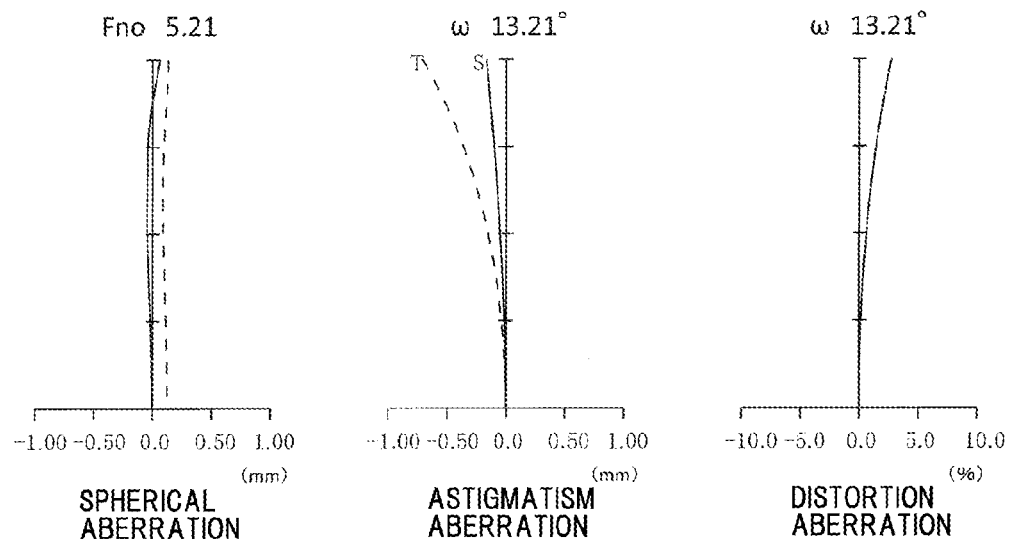
FIG. 6 is an aberration diagram at a zoom intermediate focal point of the zoom lens in Example 2.
Figure 7:
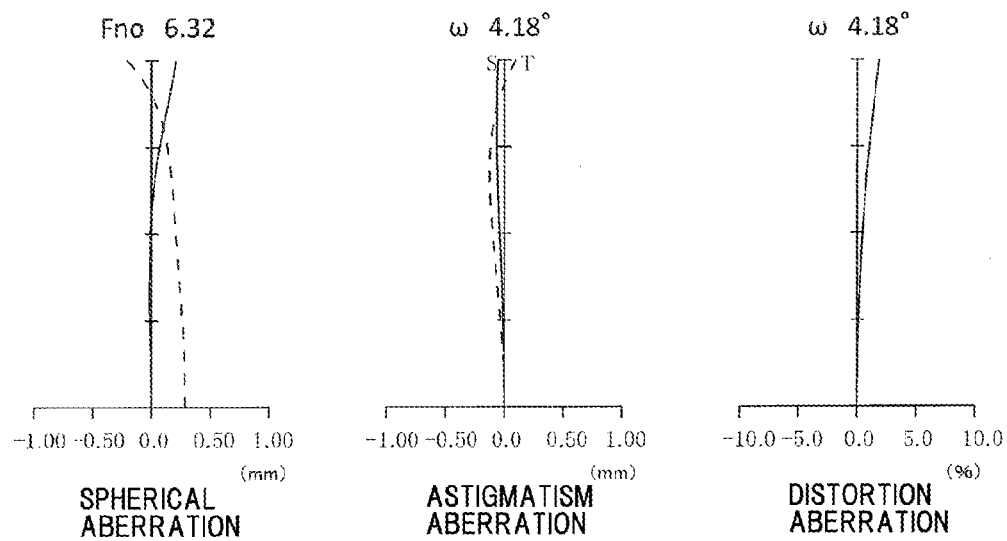
FIG. 7 is an aberration diagram at a zoom telescope end of the zoom lens in Example 2.

Tables 4, 5, and 6 respectively show the data on the respective lenses constituting the optical system 100 of the zoom lens in Example 2 including the data on the lens surfaces, the focal lengths and the aspherical surfaces. The numerical values in the respective expressions are also shown in FIG. 35. FIG. 5 is a longitudinal aberration diagram at the wide-angle end, FIG. 6 is a longitudinal aberration diagram at the intermediate focal length and FIG. 7 is a longitudinal aberration diagram at the telescope end in Example 2.

TABLE 4

| No. | R | D | Nd | ABV |
|---|---|---|---|---|
| 1 | 76.1896 | 1.2000 | 1.84666 | 23.78 |
| 2 | 51.0623 | 6.6000 | 1.49700 | 81.61 |
| 3 | −2199.3530 | 0.2000 | | |
| 4 | 50.7015 | 4.4000 | 1.51742 | 52.15 |
| 5 | 191.3145 | D(5) | | |
| 6 | 112.9542 | 1.1000 | 1.83481 | 42.72 |
| 7 | 11.5356 | 6.4500 | | |
| 8 ASPH | −25.5345 | 1.0000 | 1.53500 | 55.73 |
| 9 ASPH | 253.4659 | 0.2000 | | |
| 10 | 53.6438 | 4.2000 | 1.80518 | 25.46 |
| 11 | −22.7346 | 0.4500 | | |
| 12 | −19.1805 | 0.7000 | 1.77250 | 49.62 |
| 13 | −303.7382 | D(13) | | |
| 14 STOP | 0.0000 | 0.9000 | | |
| 15 | 32.6128 | 3.5000 | 1.48749 | 70.44 |
| 16 | −32.7476 | 1.9584 | | |
| 17 | 23.4210 | 3.2000 | 1.48749 | 70.44 |
| 18 | −110.3197 | 0.7124 | | |
| 19 | −39.7524 | 0.8000 | 1.84666 | 23.78 |
| 20 | −279.6236 | 1.9810 | | |
| 21 ASPH | −48.9769 | 0.2000 | 1.51460 | 49.96 |
| 22 | −47.3943 | 0.7000 | 1.83400 | 37.34 |
| 23 | 17.7265 | 3.0000 | 1.80518 | 25.46 |
| 24 | 275.6367 | D(24) | | |
| 25 ASPH | 73.6976 | 1.2000 | 1.53500 | 55.73 |
| 26 ASPH | 89.7986 | 0.4000 | | |
| 27 | 42.8259 | 5.4000 | 1.51680 | 64.20 |
| 28 | −19.5559 | 0.2000 | | |
| 29 | −36.5360 | 0.8000 | 1.90366 | 31.31 |
| 30 | 30.8600 | 0.3000 | | |
| 31 | 36.2216 | 4.5000 | 1.61293 | 37.00 |
| 32 | −33.8270 | D(32) | | |

TABLE 5

| F | 18.5398 | 60.1148 | 194.9320 |
|---|---|---|---|
| Fno | 3.6232 | 5.2074 | 6.3201 |
| W | 39.0021 | 13.2100 | 4.1752 |
| D(5) | 1.7370 | 25.4245 | 48.1678 |
| D(13) | 27.1439 | 11.1512 | 1.8022 |
| D(24) | 7.7166 | 2.0802 | 1.2391 |
| D(32) | 43.6507 | 77.3929 | 97.9385 |

TABLE 6

| No. | K | A4 | A6 | A8 | A10 |
|---|---|---|---|---|---|
| 8 | 0.00000E+00 | −1.33473E−05 | 1.77230E−07 | −5.18213E−09 | 6.79789E−12 |
| 9 | 0.00000E+00 | −5.52099E−05 | 7.51859E−08 | −5.23026E−09 | 1.30884E−11 |
| 21 | 0.00000E+00 | 1.10042E−05 | −1.57968E−08 | 3.75737E−10 | −2.06912E−12 |
| 25 | 0.00000E+00 | 2.65603E−05 | −4.45369E−07 | −4.33119E−09 | 2.06376E−11 |
| 26 | 0.00000E+00 | 6.90461E−05 | −3.96186E−07 | −4.53212E−09 | 2.55274E−11 |

Example 3

Next, Example 3 will be described. Since the optical system 100 of the zoom lens in Example 3 is almost the same in lens arrangement as that in Example 1 also, only differences including the lens arrangement from those in Example 1 will be described. In the optical system 100 in Example 3, the group 3b among the groups 3a and 3b constituting the third lens group G3 may also shift in the direction perpendicular to the optical axis for the vibration compensation. The shift of the group 3b for the vibration compensation is 0.092 mm, 0.190 mm, and 0.502 mm at the wide-angle end, the intermediate focal length and the telescope end respectively at a correction angle of 0.3°.

Figure 8:
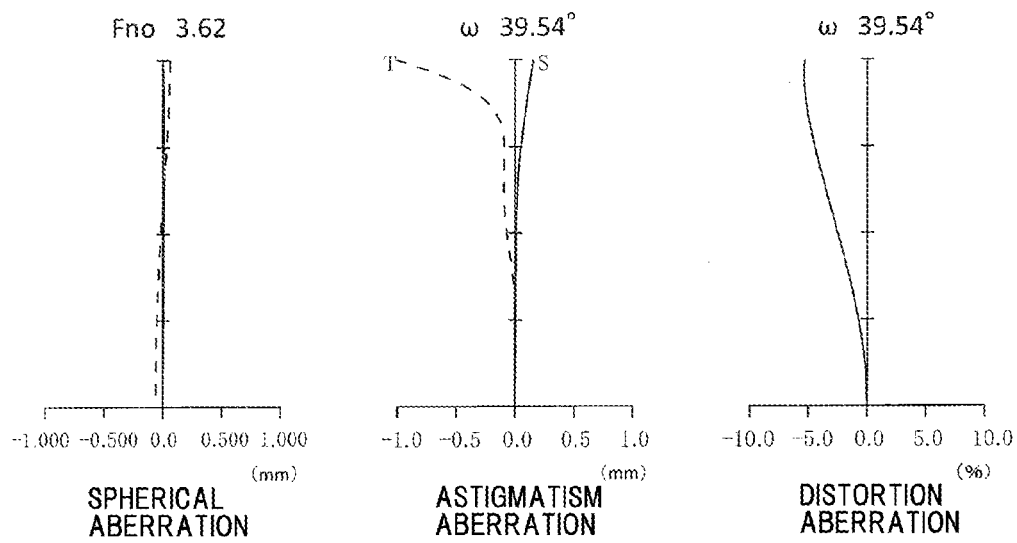
FIG. 8 is an aberration diagram at a zoom wide-angle end of the zoom lens in Example 3.
Figure 9:
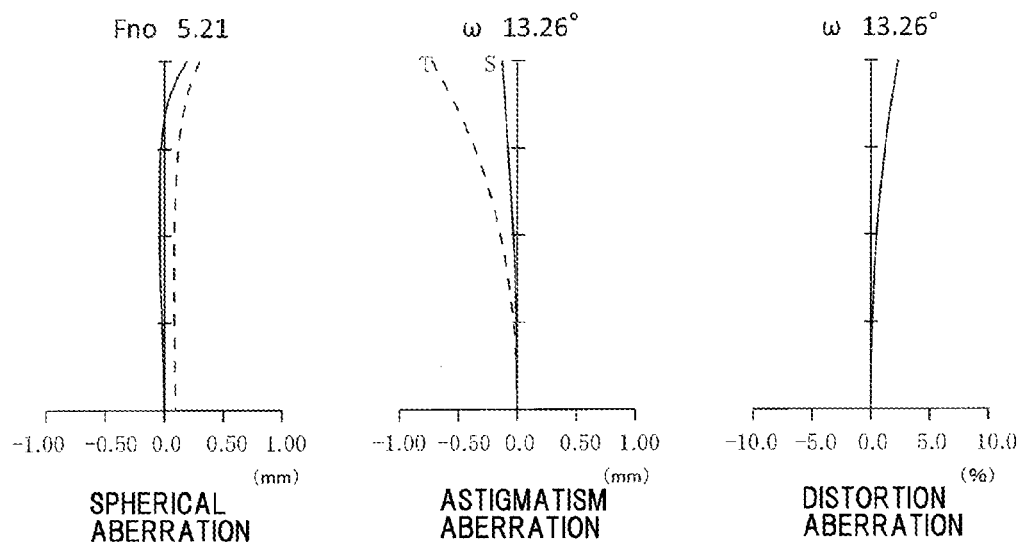
FIG. 9 is an aberration diagram at a zoom intermediate focal point of the zoom lens in Example 3.
Figure 10:
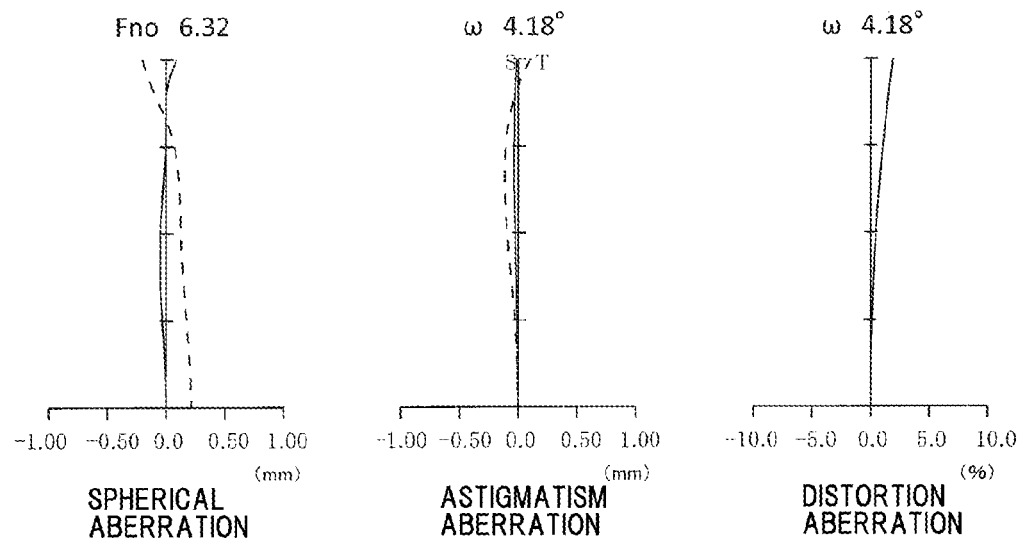
FIG. 10 is an aberration diagram at a zoom telescope end of the zoom lens in Example 3.

Tables 7, 8, and 9 respectively show the data on the respective lenses constituting the optical system 100 of the zoom lens in Example 3 including the data on the lens surfaces, the focal lengths and the aspherical surfaces. The numerical values of the respective expressions are also shown in FIG. 35. FIG. 8 is a longitudinal aberration diagram at the wide-angle end in Example 3, FIG. 9 is a longitudinal aberration diagram at the intermediate focal length, and FIG. 10 is a longitudinal aberration diagram at the telescope end in Example 3.

TABLE 7

| No. | R | D | Nd | ABV |
|---|---|---|---|---|
| 1 | 80.2915 | 1.2000 | 1.84666 | 23.78 |
| 2 | 52.6354 | 6.6000 | 1.49700 | 81.61 |
| 3 | −1504.2080 | 0.2000 | | |
| 4 | 48.7703 | 4.4000 | 1.51742 | 52.15 |
| 5 | 182.8452 | D(5) | | |
| 6 | 127.4384 | 1.1000 | 1.83481 | 42.72 |
| 7 | 11.4058 | 6.4500 | | |
| 8 ASPH | −22.0295 | 1.0000 | 1.53500 | 55.73 |
| 9 ASPH | −166.2313 | 0.2000 | | |
| 10 | 64.2442 | 4.2000 | 1.80518 | 25.46 |
| 11 | −21.2244 | 0.4500 | | |
| 12 | −17.4752 | 0.7000 | 1.77250 | 49.62 |
| 13 | −155.8897 | D(13) | | |
| 14 STOP | 0.0000 | 0.9000 | | |
| 15 | 32.6419 | 3.5000 | 1.48749 | 70.44 |
| 16 | −28.1506 | 1.5924 | | |
| 17 | 26.4974 | 3.2000 | 1.48749 | 70.44 |
| 18 | −109.3432 | 0.8000 | | |
| 19 | −29.9711 | 0.8000 | 1.84666 | 23.78 |
| 20 | −85.4292 | 2.1097 | | |
| 21 ASPH | −48.1844 | 0.2000 | 1.51460 | 49.96 |
| 22 | −46.7946 | 0.7000 | 1.83400 | 37.34 |
| 23 | 18.0979 | 3.0000 | 1.80518 | 25.46 |
| 24 | 301.6141 | D(24) | | |
| 25 ASPH | 65.5875 | 1.2000 | 1.53500 | 55.73 |
| 26 ASPH | 75.5606 | 0.4000 | | |
| 27 | 42.6692 | 5.6000 | 1.51680 | 64.20 |
| 28 | −19.3982 | 0.2000 | | |
| 29 | −39.2704 | 0.8000 | 1.90366 | 31.31 |
| 30 | 29.0278 | 0.3000 | | |
| 31 | 34.1870 | 4.5000 | 1.61293 | 37.00 |
| 32 | −35.7927 | D(32) | | |

TABLE 8

| F | 18.5399 | 60.1154 | 194.9318 |
|---|---|---|---|
| Fno | 3.6232 | 5.2074 | 6.3201 |
| W | 39.5445 | 13.2602 | 4.1751 |
| D(5) | 1.5754 | 25.3160 | 48.3736 |
| D(13) | 26.7185 | 11.0456 | 1.8000 |
| D(24) | 8.4380 | 1.7552 | 1.3513 |
| D(32) | 43.6322 | 77.6909 | 97.8393 |

TABLE 9

| No. | K | A4 | A6 | A8 | A10 |
|---|---|---|---|---|---|
| 8 | 0.00000E+00 | 2.41367E−05 | −7.38433E−08 | −8.72787E−09 | 3.81661E−11 |
| 9 | 0.00000E+00 | −2.66825E−05 | −2.95427E−07 | −6.67029E−09 | 2.59262E−11 |
| 21 | 0.00000E+00 | 1.12063E−05 | −2.06629E−08 | 5.73517E−10 | −3.92896E−12 |
| 25 | 0.00000E+00 | 3.53392E−05 | −4.51371E−07 | −5.44342E−09 | 2.54185E−11 |
| 26 | 0.00000E+00 | 7.41141E−05 | −4.05428E−07 | −5.73462E−09 | 3.14641E−11 |

Example 4

Next, Example 4 will be described. Since the optical system 100 of the zoom lens in Example 4 is almost the same in lens arrangement as that in Example 1 also, only differences including the lens arrangement from those in Example 1 will be described. In the optical system 100 in Example 4, the group 3b among the groups 3a and 3b constituting the third lens group G3 may also shift in the direction perpendicular to the optical axis for the vibration compensation. The shift of the group 3b for the vibration compensation is 0.079 mm, 0.159 mm, and 0.394 mm at the wide-angle end, the intermediate focal length and the telescope end respectively at a correction angle of 0.3°.

Figure 11:
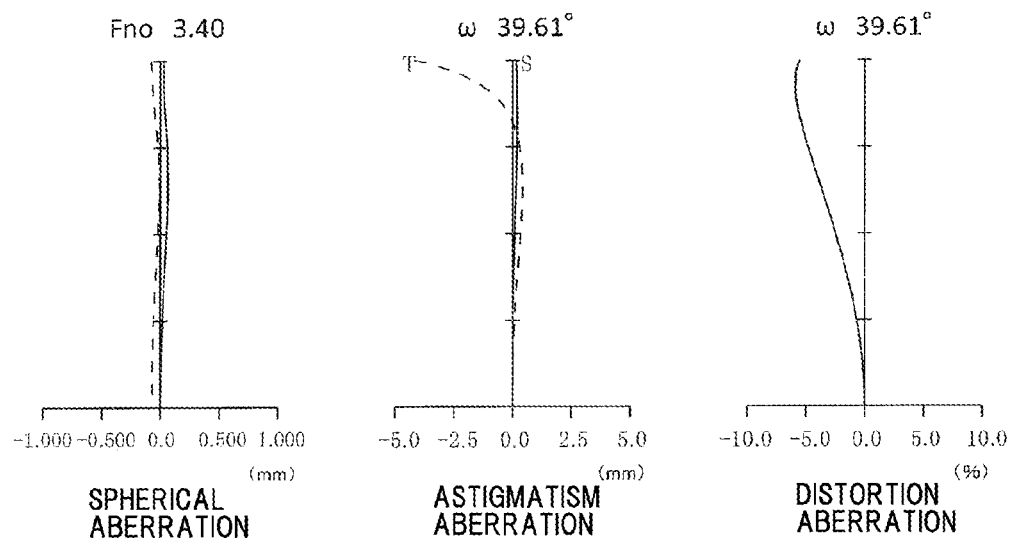
FIG. 11 is an aberration diagram at a zoom wide-angle end of the zoom lens in Example 4.
Figure 12:
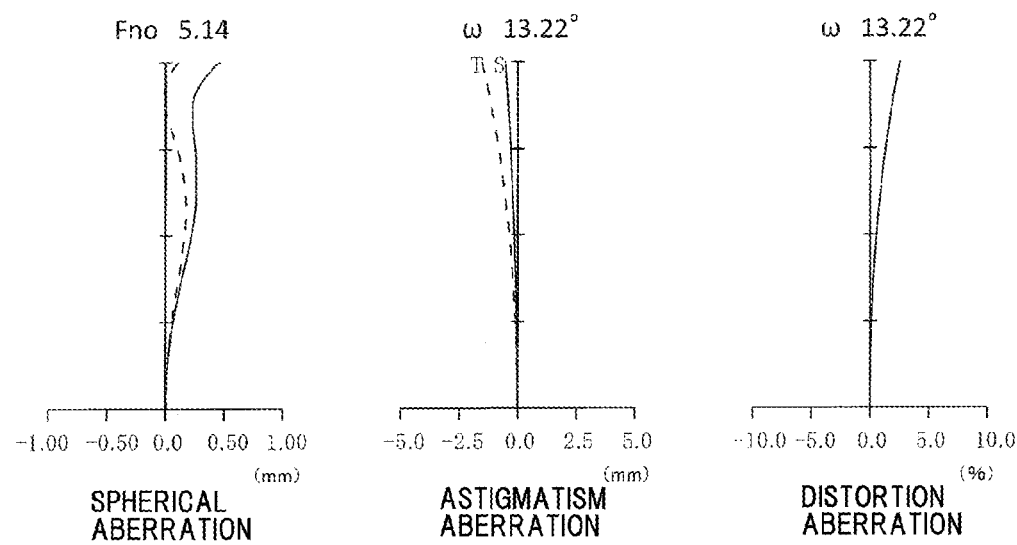
FIG. 12 is an aberration diagram at a zoom intermediate focal point of the zoom lens in Example 4.
Figure 13:
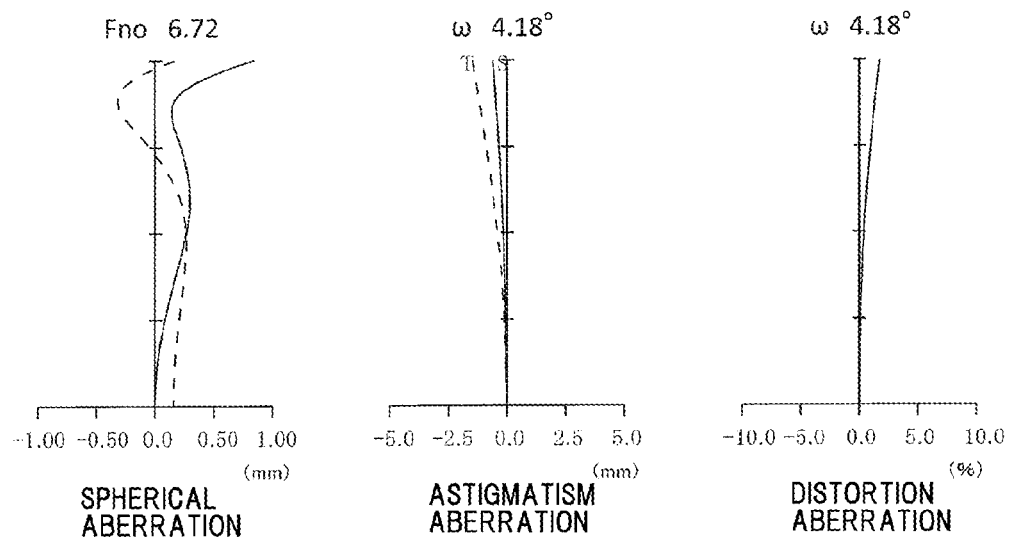
FIG. 13 is an aberration diagram at a zoom telescope end of the zoom lens in Example 4.

Tables 10, 11, and 12 respectively show the data on the respective lenses constituting the optical system 100 of the zoom lens in Example 4 including the data on the lens surfaces, the focal lengths and the aspherical surfaces. The numerical values in the respective expressions are also shown in FIG. 35. FIG. 11 is a longitudinal aberration diagram at the wide-angle end, FIG. 12 is a longitudinal aberration diagram at the intermediate focal length, and FIG. 13 is a longitudinal aberration diagram at the telescope end in Example 4.

TABLE 10

| No. | R | D | Nd | ABV |
|---|---|---|---|---|
| 1 | 85.6769 | 1.2000 | 1.84666 | 23.78 |
| 2 | 54.5491 | 6.6000 | 1.49700 | 81.61 |
| 3 | −744.1960 | 0.2000 | | |
| 4 | 51.0812 | 4.4000 | 1.51742 | 52.15 |
| 5 | 211.4159 | D(5) | | |
| 6 | 116.4863 | 1.1000 | 1.83481 | 42.72 |
| 7 | 12.9553 | 6.4500 | | |
| 8 ASPH | −30.6216 | 1.0000 | 1.53500 | 55.73 |
| 9 ASPH | 43.1756 | 0.2000 | | |
| 10 | 36.8962 | 4.2000 | 1.80518 | 25.46 |
| 11 | −24.1585 | 0.4500 | | |
| 12 | −18.9815 | 0.7000 | 1.77250 | 49.62 |
| 13 | −2518.8300 | D(13) | | |
| 14 STOP | 0.0000 | 0.9000 | | |
| 15 | 44.4322 | 3.5000 | 1.48749 | 70.44 |
| 16 | −27.9130 | 2.0548 | | |
| 17 | 24.4675 | 3.2000 | 1.48749 | 70.44 |
| 18 | −72.5666 | 0.6314 | | |
| 19 | −39.6143 | 0.8000 | 1.84666 | 23.78 |
| 20 | −254.6992 | 1.8960 | | |
| 21 ASPH | −42.9576 | 0.2000 | 1.51460 | 49.96 |
| 22 | −44.5492 | 0.7000 | 1.83400 | 37.34 |
| 23 | 16.8661 | 3.0000 | 1.80518 | 25.46 |
| 24 | 152.9125 | D(24) | | |
| 25 ASPH | 27.6365 | 2.0000 | 1.53500 | 55.73 |
| 26 ASPH | 36.8612 | 0.4000 | | |
| 27 | 33.0498 | 5.4000 | 1.51680 | 64.20 |
| 28 | −23.9442 | 0.2000 | | |
| 29 | −123.2342 | 0.8000 | 1.90366 | 31.31 |
| 30 | 21.0304 | 0.5096 | | |
| 31 | 24.4600 | 4.5000 | 1.61293 | 37.00 |
| 32 | −69.0950 | D(32) | | |

TABLE 11

| F | 18.5399 | 60.1820 | 194.9318 |
|---|---|---|---|
| Fno | 3.4035 | 5.1410 | 6.7162 |
| W | 39.6098 | 13.2190 | 4.1803 |
| D(5) | 1.5820 | 24.7478 | 47.5001 |
| D(13) | 25.1338 | 10.4459 | 1.8808 |
| D(24) | 9.8417 | 2.8601 | 1.2014 |
| D(32) | 43.2506 | 76.7171 | 101.2265 |

TABLE 12

| No. | K | A4 | A6 | A8 | A10 |
|---|---|---|---|---|---|
| 8 | 0.00000E+00 | -2.75012E-05 | 4.52637E-07 | -8.42515E-09 | 7.80026E-11 |
| 9 | 0.00000E+00 | -6.10468E-05 | 4.76965E-07 | -8.79289E-09 | 7.94088E-11 |
| 21 | 0.00000E+00 | 1.29035E-05 | -9.09540E-09 | 1.16929E-10 | -4.20437E-13 |
| 25 | 0.00000E+00 | 4.74367E-06 | -4.86981E-07 | -2.70490E-09 | 2.45037E-12 |
| 26 | 0.00000E+00 | 4.34690E-05 | -5.05282E-07 | -3.68874E-09 | 1.62240E-11 |

Example 5

Next, Example 5 will be described. Since the optical system 100 of the zoom lens in Example 5 is almost the same in lens arrangement as that in Example 1 also, only differences including the lens arrangement from those in Example 1 will be described. In the optical system 100 in Example 5, the group 3b among the groups 3a and 3b constituting the third lens group G3 may also shift in the direction perpendicular to the optical axis for the vibration compensation. The shift of the group 3b for the vibration compensation is 0.094 mm, 0.194 mm, and 0.52 mm at the wide-angle end, the intermediate focal length and the telescope end respectively at a correction angle of 0.3°.

Figure 14:
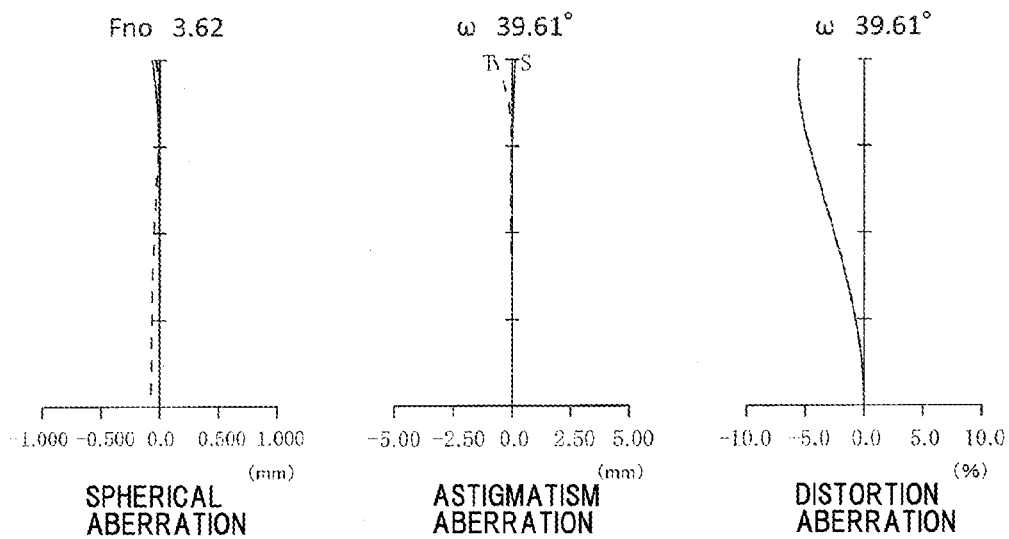
FIG. 14 is an aberration diagram at a zoom wide-angle end of the zoom lens in Example 5.
Figure 15:
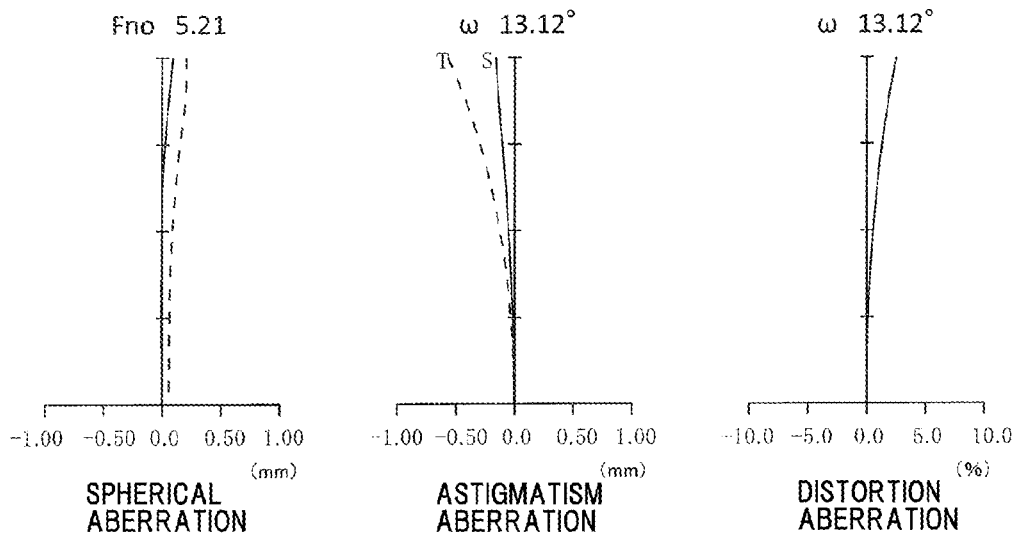
FIG. 15 is an aberration diagram at a zoom intermediate focal point of the zoom lens in Example 5.
Figure 16:
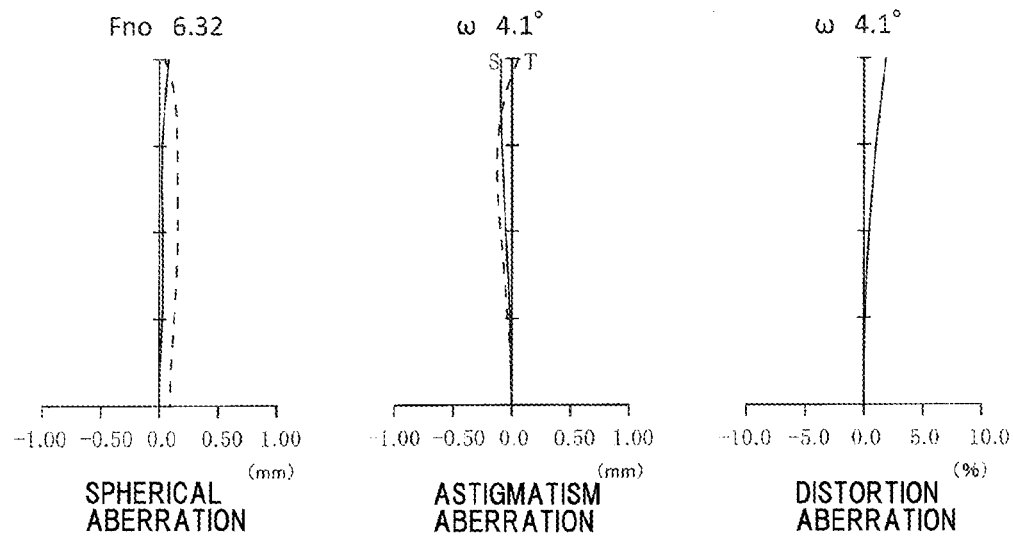
FIG. 16 is an aberration diagram at a zoom telescope end of the zoom lens in Example 5.

Tables 13, 14, and 15 respectively show the data on the respective lenses constituting the optical system 100 of the zoom lens in Example 5 including the data on the lens surfaces, the focal lengths and the aspherical surfaces. The numerical values in the respective expressions are also shown in FIG. 35. FIG. 14 is a longitudinal aberration diagram at the wide-angle end, FIG. 15 is a longitudinal aberration diagram at the intermediate focal length and FIG. 16 is a longitudinal aberration diagram at the telescope end in Example 5.

TABLE 13

| No. | R | D | Nd | ABV |
|---|---|---|---|---|
| 1 | 80.0753 | 1.2000 | 1.84666 | 23.78 |
| 2 | 52.6657 | 6.6000 | 1.49700 | 81.61 |
| 3 | -877.7232 | 0.2000 | | |
| 4 | 50.6467 | 4.4000 | 1.51742 | 52.15 |
| 5 | 190.9835 | D(5) | | |
| 6 | 174.7592 | 1.1000 | 1.83481 | 42.72 |
| 7 | 12.6963 | 6.4500 | | |
| 8 ASPH | -28.6046 | 1.0000 | 1.53500 | 55.73 |
| 9 ASPH | 69.5606 | 0.2000 | | |
| 10 | 48.4747 | 4.2000 | 1.80518 | 25.46 |
| 11 | -22.5850 | 0.4500 | | |
| 12 | -18.5148 | 0.7000 | 1.77250 | 49.62 |
| 13 | -239.4995 | D(13) | | |
| 14 STOP | 0.0000 | 0.9000 | | |
| 15 | 32.4577 | 3.5000 | 1.48749 | 70.44 |
| 16 | -31.2477 | 1.6160 | | |
| 17 | 23.7076 | 3.2000 | 1.48749 | 70.44 |
| 18 | -127.2125 | 0.5000 | | |
| 19 | -39.2405 | 0.8000 | 1.84666 | 23.78 |
| 20 | -236.9696 | 2.3842 | | |
| 21 ASPH | -49.8741 | 0.2000 | 1.51460 | 49.96 |
| 22 | -48.6856 | 0.7000 | 1.83400 | 37.34 |
| 23 | 17.6557 | 3.0000 | 1.80518 | 25.46 |
| 24 | 256.8996 | D(24) | | |
| 25 ASPH | 65.4189 | 1.2000 | 1.53500 | 55.73 |
| 26 ASPH | 101.2198 | 0.4000 | | |
| 27 | 48.5960 | 5.4000 | 1.51680 | 64.20 |
| 28 | -19.7077 | 0.2000 | | |
| 29 | -37.1355 | 0.8000 | 1.90366 | 31.31 |
| 30 | 30.2119 | 0.3000 | | |
| 31 | 35.1077 | 4.5000 | 1.61293 | 37.00 |
| 32 | -34.7772 | D(32) | | |
| 33 | 0.0000 | 1.0002 | | |
| 34 | 0.0000 | -0.0002 | | |

TABLE 14

| F | 18.5373 | 60.6578 | 198.4823 |
|---|---|---|---|
| Fno | 3.6232 | 5.2074 | 6.3201 |
| W | 39.6145 | 13.1214 | 4.1006 |
| D(5) | 1.5922 | 25.0745 | 48.2245 |
| D(13) | 27.6653 | 11.2475 | 1.8134 |
| D(24) | 8.7233 | 2.4650 | 1.2001 |
| D(32) | 42.9120 | 77.3308 | 96.2961 |

TABLE 15

| No. | K | A4 | A6 | A8 | A10 |
|---|---|---|---|---|---|
| 8 | 0.00000E+00 | -1.55406E-05 | 3.78489E-07 | -6.51143E-09 | 3.89326E-11 |
| 9 | 0.00000E+00 | -5.10051E-05 | 2.33094E-07 | -4.73142E-09 | 2.15895E-11 |
| 21 | 0.00000E+00 | 9.94358E-06 | -6.20953E-09 | 4.60030E-10 | -3.36382E-12 |
| 25 | 0.00000E+00 | 1.53465E-05 | -5.05576E-07 | -4.63042E-09 | 2.52294E-11 |
| 26 | 0.00000E+00 | 5.52023E-05 | -4.55800E-07 | -4.67480E-11 | 2.91938E-09 |

Example 6

Next, Example 6 will be described. Since the optical system 100 of the zoom lens in Example 6 is almost the same in lens arrangement as that in Example 1 also, only differences including the lens arrangement from those in Example 1 will be described. In the optical system 100 in Example 6, the group 3b among the groups 3a and 3b constituting the third lens group G3 may also shift in the direction perpendicular to the optical axis for the vibration compensation. The shift of the group 3b for the vibration compensation is 0.089 mm, 0.182 mm, and 0.46 mm at the wide-angle end, the intermediate focal length and the telescope end respectively at a correction angle of 0.3°.

Figure 17:
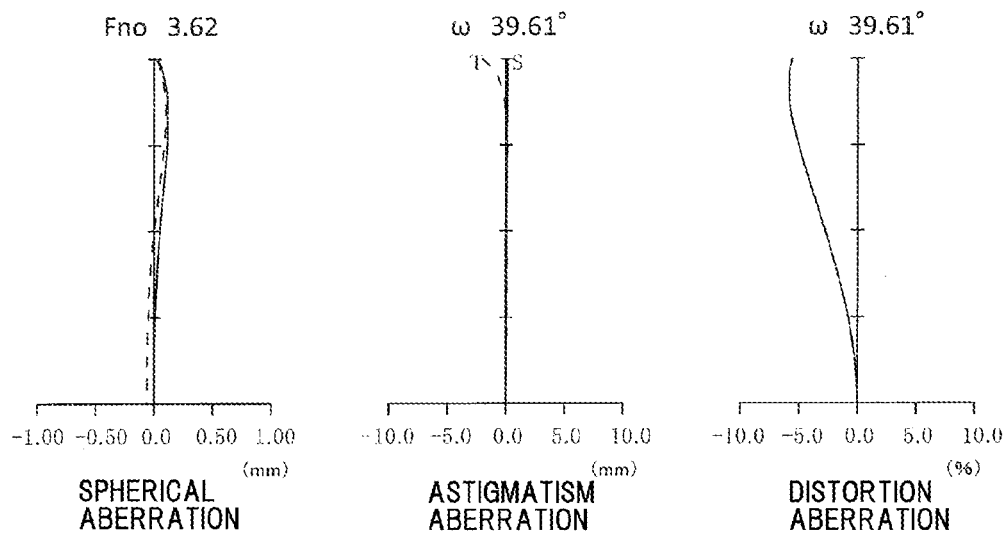
FIG. 17 is an aberration diagram at a zoom wide-angle end of the zoom lens in Example 6.
Figure 18:
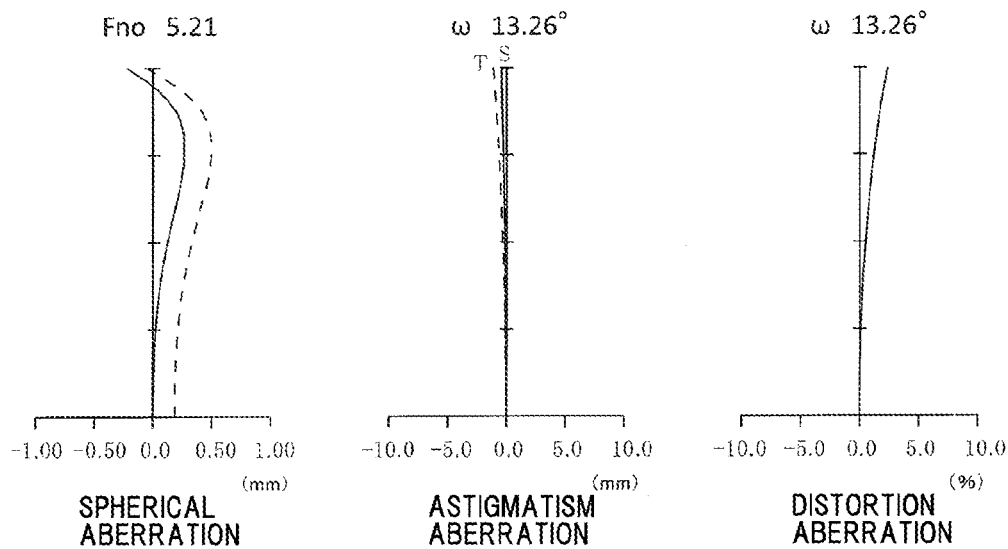
FIG. 18 is an aberration diagram at a zoom intermediate focal point of the zoom lens in Example 6.
Figure 19:
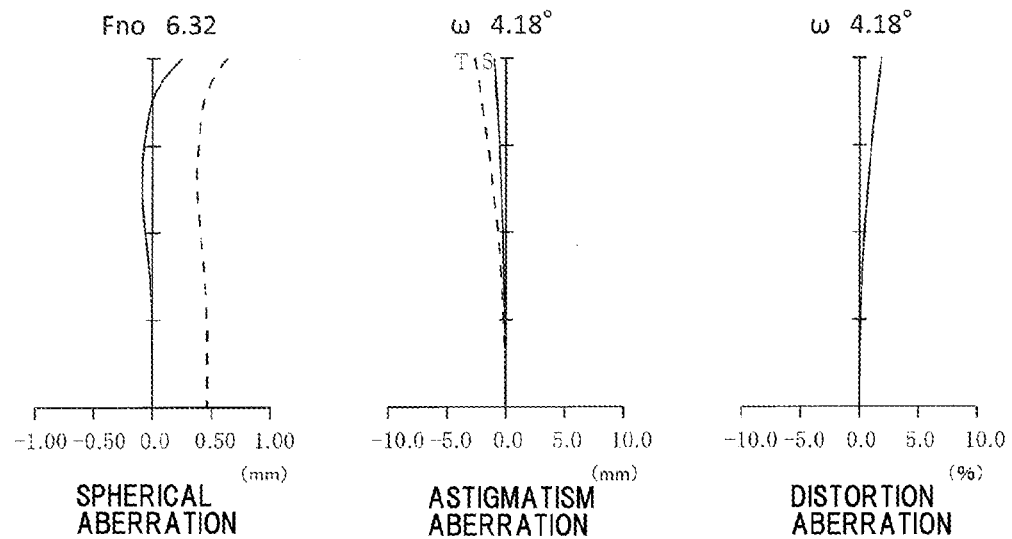
FIG. 19 is an aberration diagram at a zoom telescope end of the zoom lens in Example 6.

Tables 16, 17, and 18 respectively show the data on the respective lenses constituting the optical system 100 of the zoom lens in Example 6 including the data on the lens surfaces, the focal lengths and the aspherical surfaces. The numerical values in the respective expressions are also shown in FIG. 35. FIG. 17 is a longitudinal aberration diagram at the wide-angle end, FIG. 18 is a longitudinal aberration diagram at the intermediate focal length, and FIG. 19 is a longitudinal aberration diagram at the telescope end in Example 6.

TABLE 16

| No. | R | D | Nd | ABV |
|---|---|---|---|---|
| 1 | 93.7711 | 1.2000 | 1.84666 | 23.78 |
| 2 | 58.2256 | 6.6000 | 1.49700 | 81.61 |
| 3 | −464.8530 | 0.2000 | | |
| 4 | 48.7486 | 4.4000 | 1.51742 | 52.15 |
| 5 | 191.5000 | D(5) | | |
| 6 | 191.5000 | 1.1000 | 1.83481 | 42.72 |
| 7 | 13.5213 | 6.4500 | | |
| 8 ASPH | −26.2868 | 1.0000 | 1.53500 | 55.73 |
| 9 ASPH | 66.1801 | 0.2000 | | |
| 10 | 54.6432 | 4.2000 | 1.80518 | 25.46 |
| 11 | −22.6225 | 0.4500 | | |
| 12 | −19.2728 | 0.7000 | 1.77250 | 49.62 |
| 13 | −238.9571 | D(13) | | |
| 14 STOP | 0.0000 | 0.9000 | | |
| 15 | 31.9118 | 3.5000 | 1.48749 | 70.44 |
| 16 | −34.5240 | 2.4976 | | |
| 17 | 22.7369 | 3.2000 | 1.48749 | 70.44 |
| 18 | −114.8993 | 0.5000 | | |
| 19 | −48.0417 | 0.8000 | 1.84666 | 23.78 |
| 20 | 1354.5969 | 1.5068 | | |
| 21 ASPH | −42.8017 | 0.2000 | 1.51460 | 49.96 |
| 22 | −41.7755 | 0.7000 | 1.83400 | 37.34 |
| 23 | 18.1218 | 3.0000 | 1.80518 | 25.46 |
| 24 | 511.6480 | D(24) | | |
| 25 ASPH | 34.9797 | 1.2000 | 1.53500 | 55.73 |
| 26 ASPH | 60.6849 | 0.4000 | | |
| 27 | 45.8144 | 5.4000 | 1.51680 | 64.20 |
| 28 | −22.7514 | 0.2000 | | |
| 29 | −50.7204 | 0.8000 | 1.90366 | 31.31 |
| 30 | 25.4079 | 0.3000 | | |
| 31 | 29.9097 | 4.5000 | 1.61293 | 37.00 |
| 32 | −42.6319 | D(32) | | |

TABLE 17

| F | 18.5400 | 60.1123 | 194.9318 |
|---|---|---|---|
| Fno | 3.6232 | 5.2074 | 6.3201 |
| W | 39.6086 | 13.2574 | 4.1751 |
| D(5) | 1.5679 | 24.5305 | 47.0537 |
| D(13) | 27.3496 | 11.1325 | 1.9807 |
| D(24) | 9.1029 | 3.0915 | 1.2021 |
| D(32) | 42.8085 | 76.78439 | 9.7054 |

TABLE 18

| No. | K | A4 | A6 | A8 | A10 |
|---|---|---|---|---|---|
| 8 | 0.00000E+00 | −1.57783E−05 | 3.47553E−07 | −4.49279E−09 | 3.46545E−11 |
| 9 | 0.00000E+00 | −4.37479E−05 | 2.09462E−07 | −2.47794E−09 | 2.17697E−11 |
| 21 | 0.00000E+00 | 1.12892E−05 | −2.03616E−08 | 1.39390E−10 | −7.50392E−13 |
| 25 | 0.00000E+00 | 1.06310E−05 | −5.00666E−07 | −3.57362E−09 | 2.31277E−11 |
| 26 | 0.00000E+00 | 4.90997E−05 | −4.91326E−07 | −4.07391E−09 | 2.72747E−11 |

Example 7

Next, Example 7 will be described. Since the optical system 100 of the zoom lens in Example 7 is almost the same in lens arrangement as that in Example 1 also, only differences including the lens arrangement from those in Example 1 will be described. In the optical system 100 in Example 7, the group 3b among the groups 3a and 3b constituting the third lens group G3 may also shift in the direction perpendicular to the optical axis for the vibration compensation. The shift of the group 3b for the vibration compensation is 0.094 mm, 0.194 mm, and 0.52 mm at the wide-angle end, the intermediate focal length and the telescope end respectively at a correction angle of 0.3°.

Figure 20:
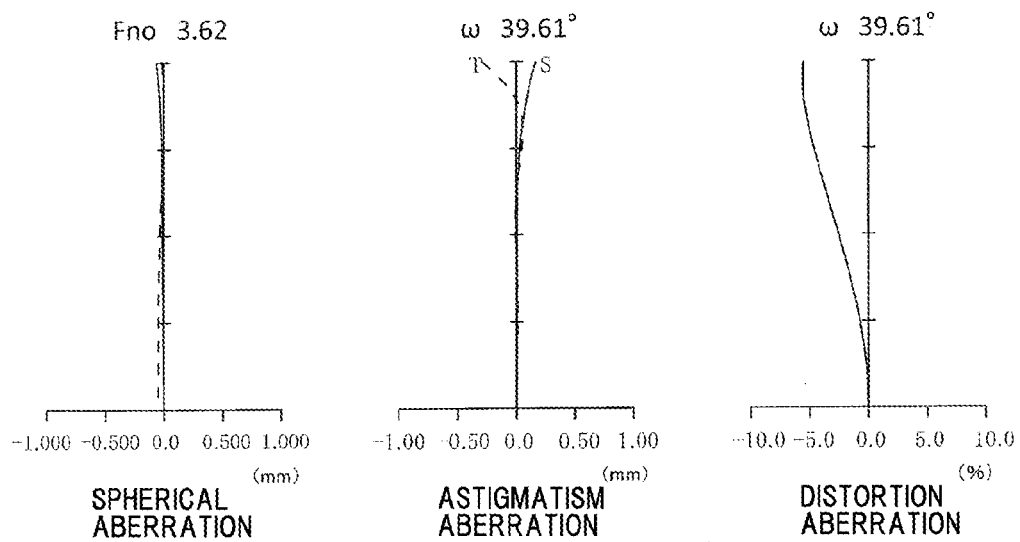
FIG. 20 is an aberration diagram at a zoom wide-angle end of the zoom lens in Example 7.
Figure 21:
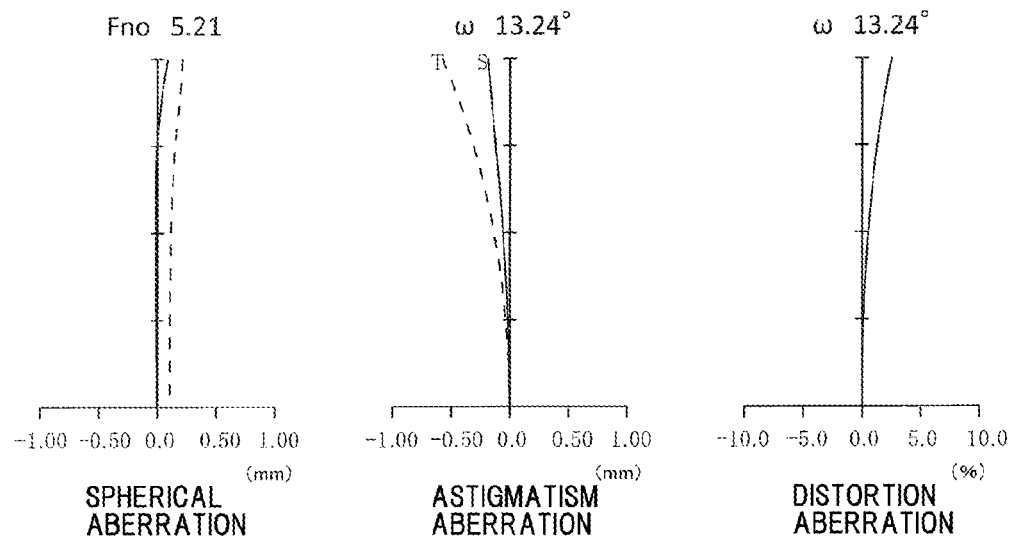
FIG. 21 is an aberration diagram at a zoom intermediate focal point of the zoom lens in Example 7.
Figure 22:
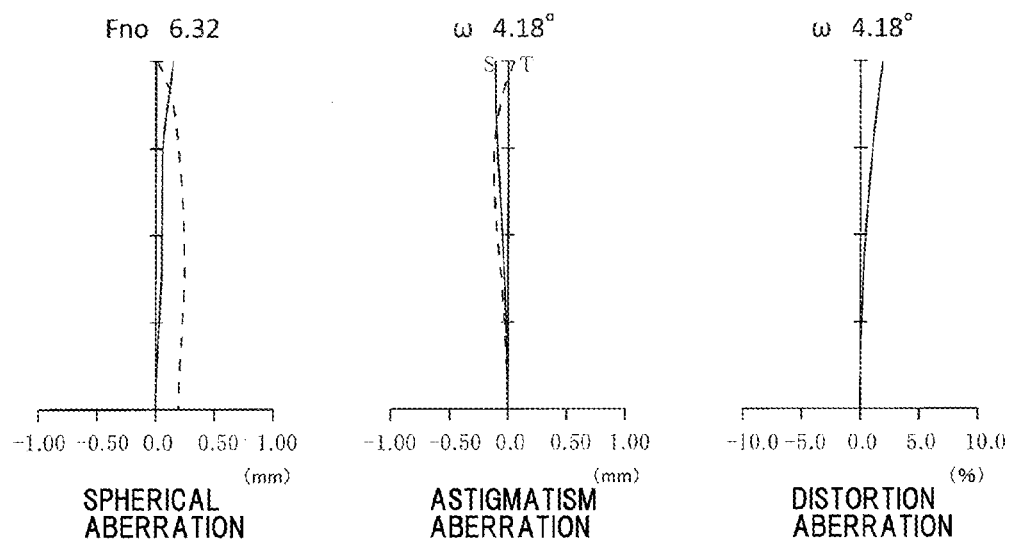
FIG. 22 is an aberration diagram at a zoom telescope end of the zoom lens in Example 7.

Tables 19, 20, and 21 respectively show the data on the respective lenses constituting the optical system 100 of the zoom lens in Example 7 including the data on the lens surfaces, the focal lengths and the aspherical surfaces. The numerical values in the respective expressions are also shown in FIG. 35. FIG. 20 is a longitudinal aberration diagram at the wide-angle end, FIG. 21 is a longitudinal aberration diagram at the intermediate focal length, and FIG. 22 is a longitudinal aberration diagram at the telescope end in Example 7.

TABLE 19

| No. | R | D | Nd | ABV |
|---|---|---|---|---|
| 1 | 82.3005 | 1.2000 | 1.84666 | 23.78 |
| 2 | 53.6597 | 6.6000 | 1.49700 | 81.61 |
| 3 | −764.2183 | 0.2000 | | |
| 4 | 50.2876 | 4.4000 | 1.51742 | 52.15 |
| 5 | 185.8890 | D (5) | | |
| 6 | 166.4728 | 1.1000 | 1.83481 | 42.72 |
| 7 | 12.4585 | 6.4500 | | |
| 8 ASPH | −29.0084 | 1.0000 | 1.50940 | 59.24 |
| 9 ASPH | 80.0402 | 0.2000 | | |
| 10 | 48.6346 | 4.2000 | 1.80518 | 25.46 |
| 11 | −23.2885 | 0.4500 | | |
| 12 | −19.1296 | 0.7000 | 1.77250 | 49.62 |
| 13 | −361.3661 | D (13) | | |
| 14 STOP | 0.0000 | 0.9000 | | |
| 15 | 31.0644 | 3.5000 | 1.48749 | 70.44 |
| 16 | −32.1598 | 1.9336 | | |
| 17 | 24.4587 | 3.2000 | 1.48749 | 70.44 |
| 18 | −113.7070 | 0.5000 | | |
| 19 | −37.5085 | 0.8000 | 1.84666 | 23.78 |
| 20 | −201.9130 | 2.0664 | | |
| 21 ASPH | −50.0652 | 0.2000 | 1.51460 | 49.96 |
| 22 | −48.3585 | 0.7000 | 1.83400 | 37.34 |
| 23 | 17.5618 | 3.0000 | 1.80518 | 25.46 |
| 24 | 261.8596 | D (24) | | |
| 25 ASPH | 58.1715 | 1.2000 | 1.50940 | 59.24 |
| 26 ASPH | 72.6899 | 0.4000 | | |
| 27 | 43.0413 | 5.4000 | 1.51680 | 64.20 |
| 28 | −19.9516 | 0.2000 | | |
| 29 | −36.9168 | 0.8000 | 1.90366 | 31.31 |
| 30 | 30.6164 | 0.3000 | | |
| 31 | 36.2661 | 4.5000 | 1.61293 | 37.00 |
| 32 | −33.7701 | D (32) | | |

TABLE 20

| F | 18.5400 | 60.1164 | 194.9318 |
|---|---|---|---|
| Fno | 3.6232 | 5.2074 | 6.3201 |
| W | 39.6116 | 13.2384 | 4.1751 |
| D (5) | 1.6114 | 24.8421 | 48.2227 |
| D (13) | 27.9005 | 11.2807 | 1.8192 |
| D (24) | 8.2245 | 2.2825 | 1.2000 |
| D (32) | 43.1629 | 77.4248 | 96.7676 |

TABLE 21

| No | K | A4 | A6 | A8 | A10 |
|---|---|---|---|---|---|
| 8 | 0.00000E+00 | −2.32018E−05 | 3.38202E−07 | −5.38305E−09 | 2.38936E−11 |
| 9 | 0.00000E+00 | −6.09306E−05 | 2.08607E−07 | −3.97216E−09 | 1.08967E−11 |
| 21 | 0.00000E+00 | 1.11643E−05 | −2.50338E−08 | 5.20362E−10 | −2.99952E−12 |
| 25 | 0.00000E+00 | 2.25225E−05 | −5.39613E−07 | −4.13519E−09 | 2.21612E−11 |
| 26 | 0.00000E+00 | 6.49335E−05 | −5.05248E−07 | −4.22135E−09 | 2.68070E−11 |

Example 8

Next, Example 8 will be described. Since the optical system 100 of the zoom lens in Example 8 is almost the same in lens arrangement as that in Example 1 also, only differences including the lens arrangement from those in Example 1 will be described. In the optical system 100 in Example 8, the group 3b among the groups 3a and 3b constituting the third lens group G3 may also shift in the direction perpendicular to the optical axis for the vibration compensation. The shift of the group 3b for the vibration compensation is 0.095 mm, 0.195 mm, and 0.505 mm at the wide-angle end, the intermediate focal length and the telescope end respectively at a correction angle of 0.3°.

Figure 23:
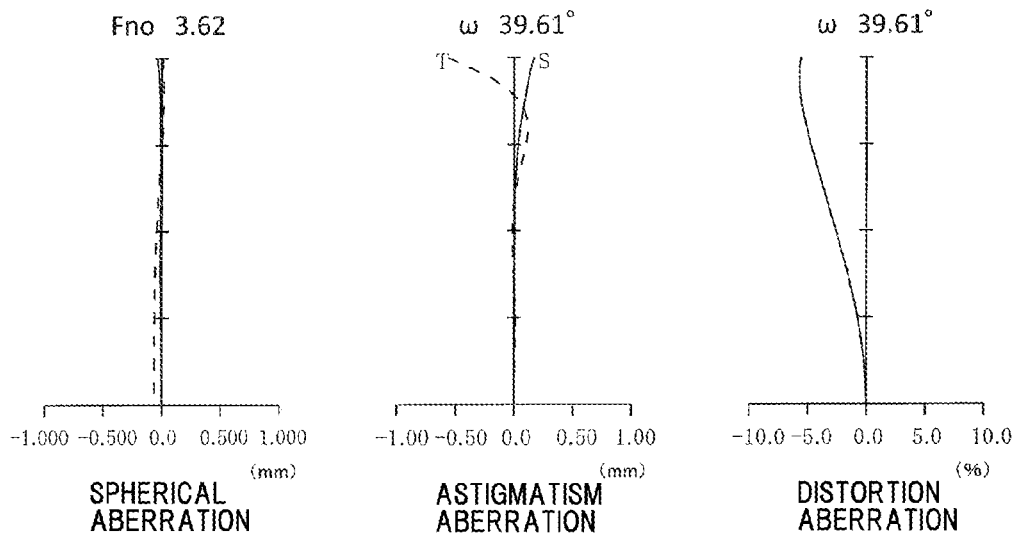
FIG. 23 is an aberration diagram at a zoom wide-angle end of the zoom lens in Example 8.
Figure 24:
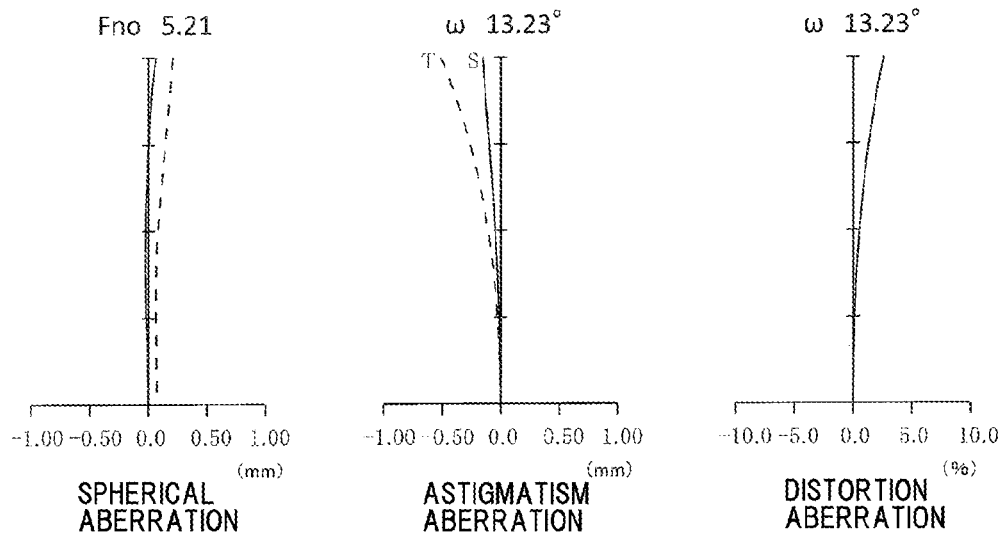
FIG. 24 is an aberration diagram at a zoom intermediate focal point of the zoom lens in Example 8.
Figure 25:
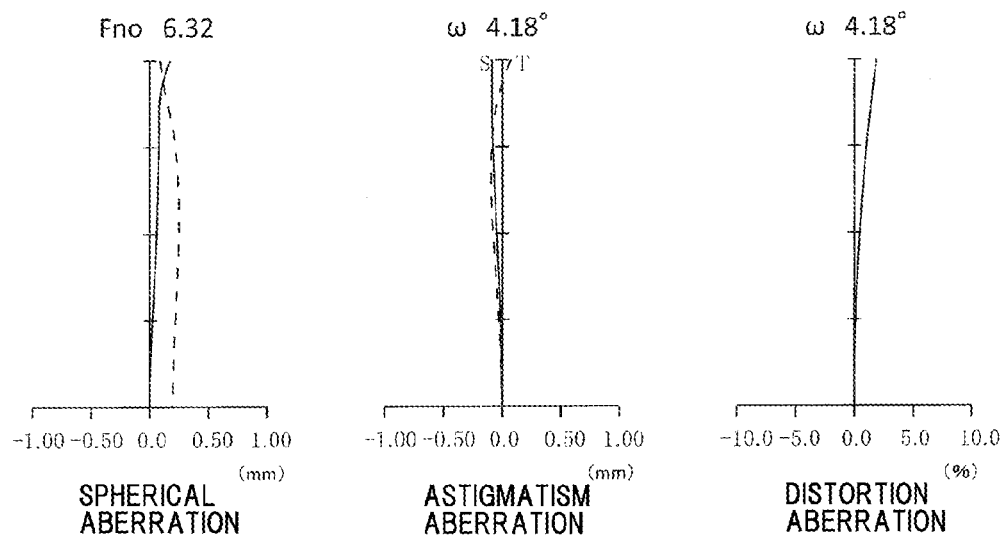
FIG. 25 is an aberration diagram at a zoom telescope end of the zoom lens in Example 8.

Tables 22, 23, and 24 respectively show the data on the respective lenses constituting the optical system 100 of the zoom lens in Example 8 including the data on the lens surfaces, the focal lengths and the aspherical surfaces. The numerical values in the respective expressions are also shown in FIG. 35. FIG. 23 is a longitudinal aberration diagram at the wide-angle end, FIG. 24 is a longitudinal aberration diagram at the intermediate focal length, and FIG. 25 is a longitudinal aberration diagram at the telescope end in Example 8.

TABLE 22

| No. | R | D | Nd | ABV |
|---|---|---|---|---|
| 1 | 85.0625 | 1.2000 | 1.84666 | 23.78 |
| 2 | 54.9577 | 6.6000 | 1.49700 | 81.61 |
| 3 | −607.1361 | 0.2000 | | |
| 4 | 50.1238 | 4.4000 | 1.51742 | 52.15 |
| 5 | 179.3495 | D (5) | | |
| 6 | 109.6272 | 1.1000 | 1.83481 | 42.72 |
| 7 | 12.4799 | 6.4500 | | |
| 8 ASPH | −25.2727 | 1.0000 | 1.54408 | 58.86 |
| 9 ASPH | 92.0324 | 0.2000 | | |
| 10 | 47.2897 | 4.2000 | 1.80518 | 25.46 |
| 11 | −22.9217 | 0.4500 | | |
| 12 | −18.4256 | 0.7000 | 1.77250 | 49.62 |
| 13 | −253.8689 | D (13) | | |
| 14 STOP | 0.0000 | 0.9000 | | |
| 15 | 33.9638 | 3.5000 | 1.48749 | 70.44 |
| 16 | −30.3338 | 1.9780 | | |
| 17 | 24.1621 | 3.2000 | 1.48749 | 70.44 |
| 18 | −110.7370 | 0.5000 | | |
| 19 | −36.4524 | 0.8000 | 1.84666 | 23.78 |
| 20 | −168.6463 | 2.0220 | | |
| 21 ASPH | −48.8377 | 0.2000 | 1.51460 | 49.96 |
| 22 | −47.5780 | 0.7000 | 1.83400 | 37.34 |
| 23 | 18.1017 | 3.0000 | 1.80518 | 25.46 |

TABLE 22-continued

| No. | R | D | Nd | ABV |
|---|---|---|---|---|
| 24 | 328.9094 | D (24) | | |
| 25 ASPH | 56.6163 | 1.2000 | 1.54408 | 58.86 |
| 26 ASPH | 101.1275 | 0.4000 | | |
| 27 | 54.6499 | 5.4000 | 1.51680 | 64.20 |
| 28 | −19.9140 | 0.2000 | | |
| 29 | −36.5392 | 0.8000 | 1.90366 | 31.31 |
| 30 | 31.1146 | 0.3000 | | |
| 31 | 36.8934 | 4.5000 | 1.61293 | 37.00 |
| 32 | −33.2897 | D (32) | | |

TABLE 23

| F | 18.5400 | 60.1161 | 194.9318 |
|---|---|---|---|
| Fno | 3.6232 | 5.2074 | 6.3201 |
| W | 39.6116 | 13.2264 | 4.1751 |
| D (5) | 1.5904 | 25.2692 | 48.1769 |
| D (13) | 27.1839 | 11.1318 | 1.9298 |
| D (24) | 8.5826 | 2.2602 | 1.2000 |
| D (32) | 43.5378 | 77.6122 | 99.8380 |

TABLE 24

| No. | K | A4 | A6 | A8 | A10 |
|---|---|---|---|---|---|
| 8 | 0.00000E+00 | −1.55487E−05 | 3.66150E−07 | −8.18725E−09 | 5.28498E−11 |
| 9 | 0.00000E+00 | −4.71340E−05 | 2.04438E−07 | −5.69330E−09 | 3.19578E−11 |
| 21 | 0.00000E+00 | 9.94852E−06 | 9.24886E−09 | 5.58025E−11 | −6.70873E−13 |
| 25 | 0.00000E+00 | 3.49318E−05 | −4.56057E−07 | −5.18299E−09 | 1..94311E−11 |
| 26 | 0.00000E+00 | 7.11129E−05 | −3.80017E−07 | −6.15180E−09 | 2.84346E−11 |

Example 9

Next, Example 9 will be described. Since the optical system 100 of the zoom lens in Example 9 is almost the same in lens arrangement as that in Example 1 also, only differences including the lens arrangement from those in Example 1 will be described. In the optical system 100 in Example 9, the group 3b among the groups 3a and 3b constituting the third lens group G3 may also shift in the direction perpendicular to the optical axis for the vibration compensation. The shift of the group 3b for the vibration compensation is 0.096 mm, 0.198 mm, and 0.51 mm at the wide-angle end, the intermediate focal length and the telescope end respectively at a correction angle of 0.3°.

Figure 26:
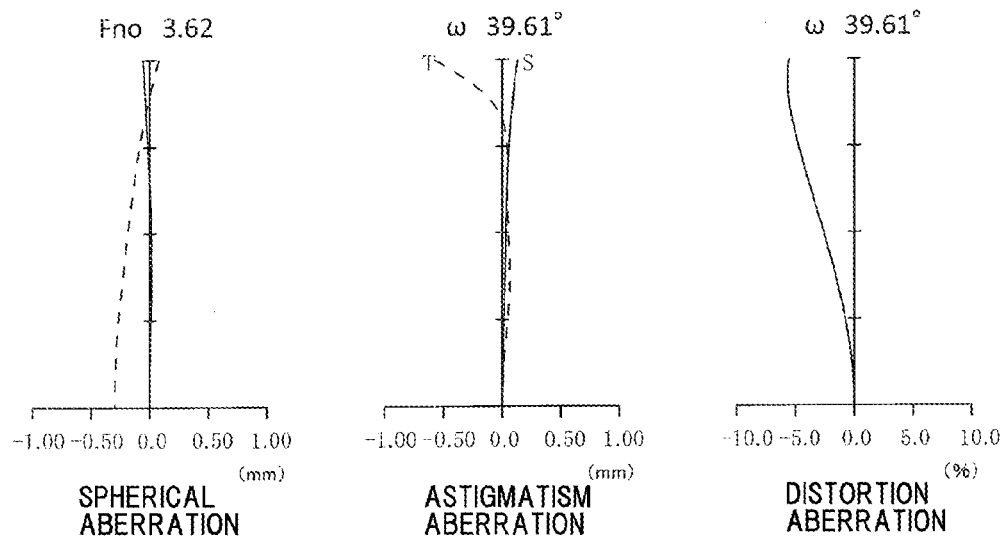
FIG. 26 is an aberration diagram at a zoom wide-angle end of the zoom lens in Example 9.
Figure 27:
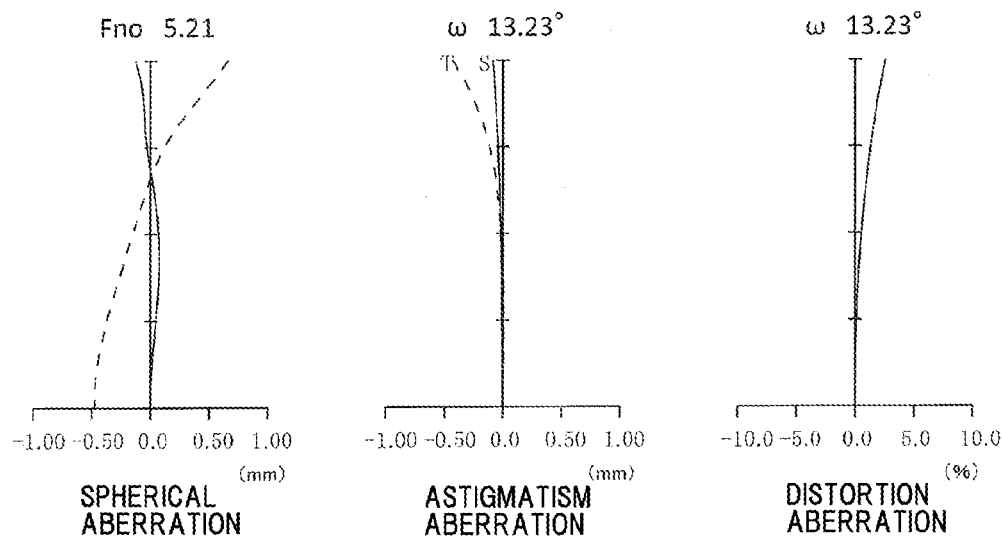
FIG. 27 is an aberration diagram at a zoom intermediate focal point of the zoom lens in Example 9.
Figure 28:
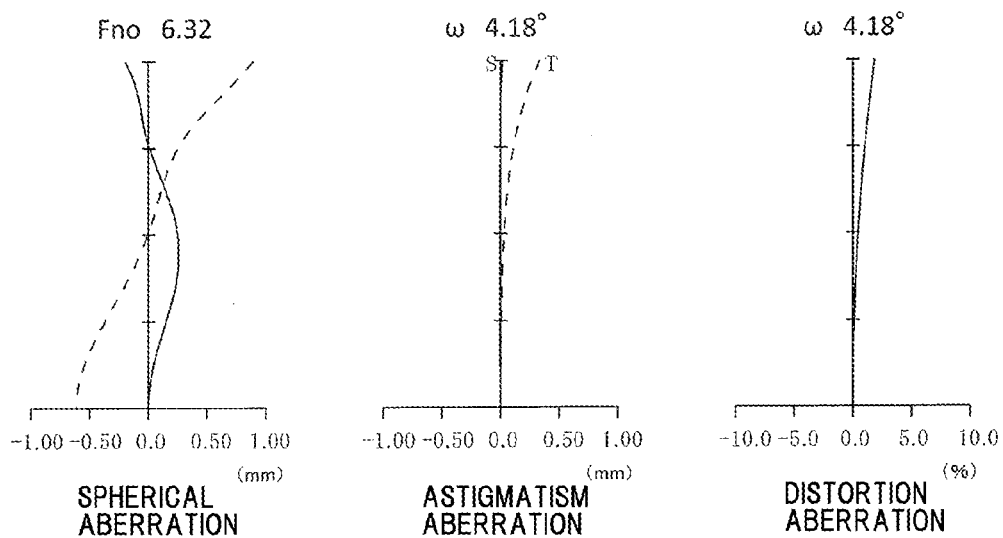
FIG. 28 is an aberration diagram at a zoom telescope end of the zoom lens in Example 9.

Tables 25, 26, and 27 respectively show the data on the respective lenses constituting the optical system 100 of the zoom lens in Example 9 including the data on the lens surfaces, the focal lengths and the aspherical surfaces. The numerical values in the respective expressions are also shown in FIG. 35. FIG. 26 is a longitudinal aberration diagram at the wide-angle end, FIG. 27 is a longitudinal aberration diagram at the intermediate focal length, and FIG. 28 is a longitudinal aberration diagram at the telescope end in Example 9.

TABLE 25

| No. | R | D | Nd | ABV |
|---|---|---|---|---|
| 1 | 84.8615 | 1.2000 | 1.84666 | 23.78 |
| 2 | 54.8769 | 6.6000 | 1.49700 | 81.61 |
| 3 | −575.6538 | 0.2000 | | |
| 4 | 50.0207 | 4.4000 | 1.51742 | 52.15 |
| 5 | 174.1575 | D (5) | | |
| 6 | 97.9632 | 1.1000 | 1.83481 | 42.72 |
| 7 | 12.2647 | 6.4500 | | |
| 8 ASPH | −24.6447 | 1.0000 | 1.54408 | 58.86 |
| 9 ASPH | 106.4060 | 0.2000 | | |
| 10 | 45.9586 | 4.2000 | 1.80518 | 25.46 |
| 11 | −23.1514 | 0.4500 | | |
| 12 | −18.5784 | 0.7000 | 1.77250 | 49.62 |
| 13 | −322.1643 | D (13) | | |
| 14 STOP | 0.0000 | 0.9000 | | |
| 15 | 33.0555 | 3.5000 | 1.48749 | 70.44 |
| 16 | −31.5217 | 2.6019 | | |
| 17 | 24.7751 | 3.2000 | 1.48749 | 70.44 |
| 18 | −93.4884 | 0.5000 | | |
| 19 | −33.2766 | 0.8000 | 1.84666 | 23.78 |
| 20 | −121.3784 | 1.6187 | | |
| 21 ASPH | −53.0797 | 0.2000 | 1.51460 | 49.96 |
| 22 | −51.4176 | 0.7000 | 1.83400 | 37.34 |
| 23 | 18.2724 | 3.0000 | 1.80518 | 25.46 |
| 24 | 232.2540 | D (24) | | |
| 25 ASPH | 113.4496 | 1.2000 | 1.63980 | 24.53 |
| 26 ASPH | 410.8672 | 0.4000 | | |
| 27 | 55.2935 | 5.4000 | 1.51680 | 64.20 |
| 28 | −19.3399 | 0.2000 | | |
| 29 | −48.2620 | 0.8000 | 1.90366 | 31.31 |
| 30 | 25.5419 | 0.3000 | | |
| 31 | 26.7036 | 4.5000 | 1.61293 | 37.00 |
| 32 | −50.4263 | D (32) | | |

TABLE 26

| F | 18.5400 | 60.1171 | 194.9342 |
|---|---|---|---|
| Fno | 3.6232 | 5.2074 | 6.3201 |
| W | 39.6111 | 13.2285 | 4.1763 |
| D (5) | 1.5898 | 25.3418 | 48.1747 |
| D (13) | 26.9486 | 11.0946 | 1.8993 |
| D (24) | 8.8194 | 2.6313 | 1.7288 |
| D (32) | 42.9804 | 76.7226 | 99.0978 |

TABLE 27

| No. | K | A4 | A6 | A8 | A10 |
|---|---|---|---|---|---|
| 8 | 0.00000E+00 | −2.38538E−05 | 3.87580E−07 | −7.87406E−09 | 4.79178E−11 |
| 9 | 0.00000E+00 | −5.41270E−05 | 2.18584E−07 | −5.33422E−09 | 2.82916E−11 |
| 21 | 0.00000E+00 | 8.32109E−06 | 7.51381E−08 | −1.01081E−09 | 5.02391E−12 |
| 25 | 0.00000E+00 | 3.59980E−05 | −3.66428E−07 | −4.51724E−09 | 2.42416E−11 |
| 26 | 0.00000E+00 | 7.00811E−05 | −3.00925E−07 | −4.75068E−09 | 2.66589E−11 |

Example 10

Next, Example 10 will be described. Since the optical system 100 of the zoom lens in Example 10 is almost the same in lens arrangement as that in Example 1 also, only differences including the lens arrangement from those in Example 1 will be described. In the optical system 100 in Example 10, the group 3b among the groups 3a and 3b constituting the third lens group G3 may also shift in the direction perpendicular to the optical axis for the vibration compensation. The shift of the group 3b for the vibration compensation is 0.089 mm, 0.181 mm, and 0.474 mm at the wide-angle end, the intermediate focal length and the telescope end respectively at a correction angle of 0.3°.

Figure 29:
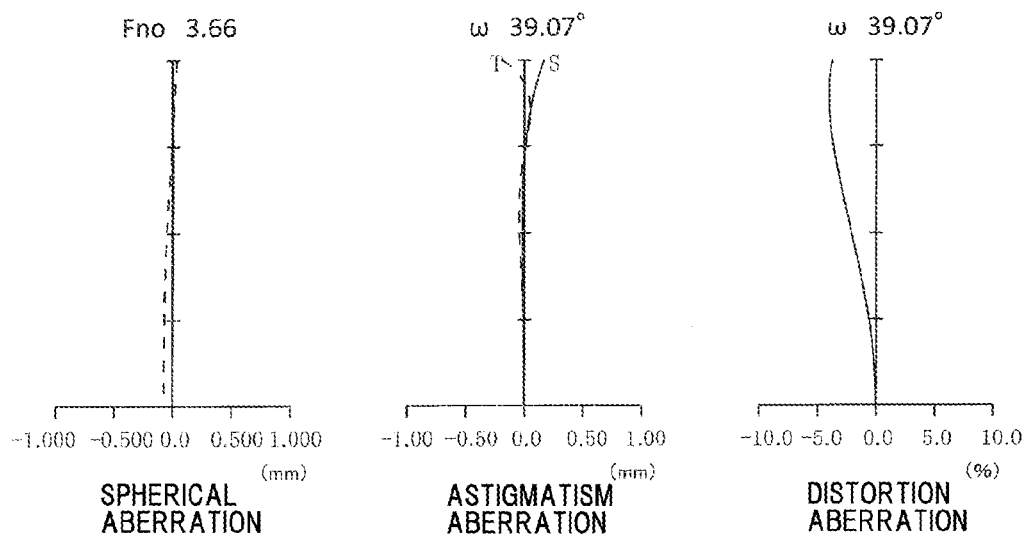
FIG. 29 is an aberration diagram at a zoom wide-angle end of the zoom lens in Example 10.
Figure 30:
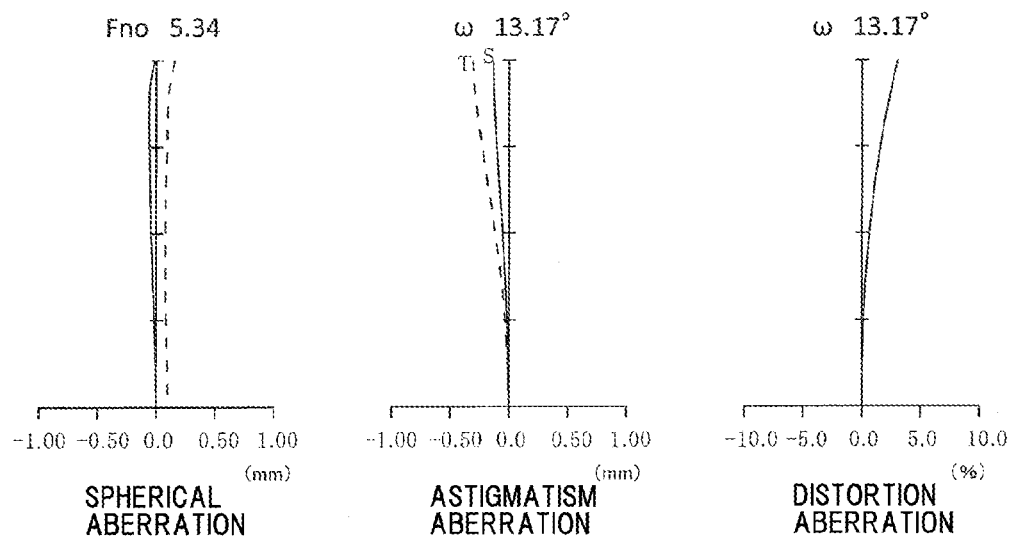
FIG. 30 is an aberration diagram at a zoom intermediate focal point of the zoom lens in Example 10.
Figure 31:
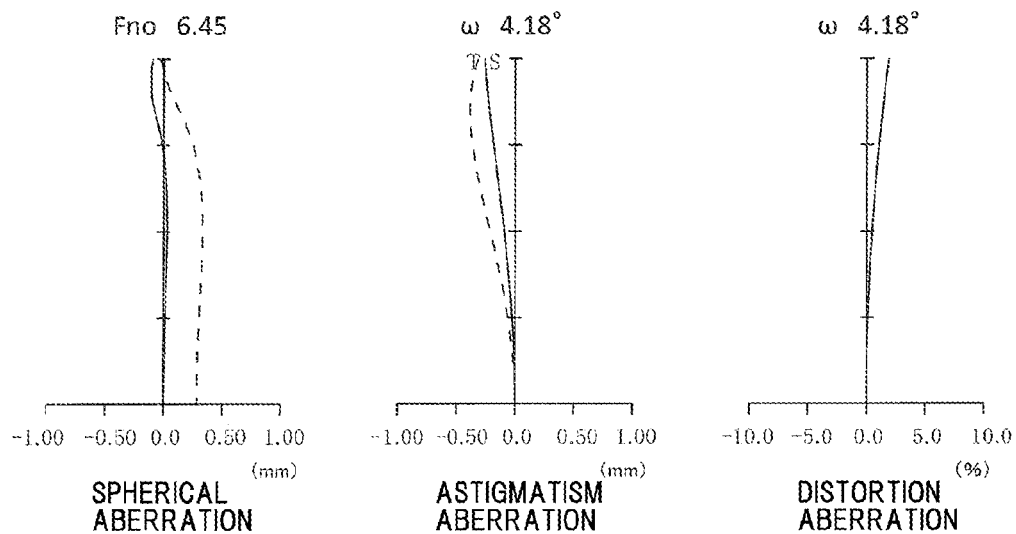
FIG. 31 is an aberration diagram at a zoom telescope end of the zoom lens in Example 10.

Tables 28, 29, and 30 respectively show the data on the respective lenses constituting the optical system 100 of the zoom lens in Example 10 including the data on the lens surfaces, the focal lengths and the aspherical surfaces. The numerical values in the respective expressions are also shown in FIG. 35. FIG. 29 is a longitudinal aberration diagram at the wide-angle end, FIG. 30 is a longitudinal aberration diagram at the intermediate focal length, and FIG. 31 is a longitudinal aberration diagram at the telescope end in Example 10.

TABLE 28

| No. | R | D | Nd | ABV |
|---|---|---|---|---|
| 1 | 78.7433 | 1.2000 | 1.84666 | 23.78 |
| 2 | 52.6992 | 6.7000 | 1.49700 | 81.61 |
| 3 | −667.7771 | 0.2000 | | |
| 4 | 52.6948 | 4.4000 | 1.51742 | 52.15 |
| 5 | 176.8095 | D (5) | | |
| 6 | 171.4263 | 1.2000 | 1.83481 | 42.72 |
| 7 | 12.4677 | 6.3809 | | |
| 8 ASPH | −30.1202 | 1.0000 | 1.53110 | 58.60 |
| 9 ASPH | 74.4645 | 0.2000 | | |
| 10 | 50.1721 | 4.4000 | 1.80518 | 25.46 |
| 11 | −23.5391 | 0.4600 | | |
| 12 | −19.6638 | 0.7000 | 1.77250 | 49.62 |
| 13 | −268.9056 | D (13) | | |
| 14 STOP | 0.0000 | 0.9000 | | |
| 15 | 29.3794 | 3.6000 | 1.48749 | 70.44 |
| 16 | −37.4302 | 1.6270 | | |
| 17 | 23.8446 | 3.7000 | 1.48749 | 70.44 |
| 18 | −89.4371 | 0.4000 | | |
| 19 | −42.6556 | 0.8000 | 1.84666 | 23.78 |
| 20 | −512.7271 | D (20) | | |
| 21 ASPH | −46.7691 | 0.2000 | 1.51460 | 49.96 |
| 22 | −46.9730 | 0.8000 | 1.83400 | 37.34 |
| 23 | 17.0833 | 3.1000 | 1.80518 | 25.46 |
| 24 | 212.5403 | D (24) | | |
| 25 ASPH | 48.5158 | 1.2000 | 1.53110 | 58.60 |
| 26 ASPH | 58.0346 | 0.1500 | | |
| 27 | 33.7204 | 5.6000 | 1.51680 | 64.20 |
| 28 | −22.3278 | 0.1560 | | |
| 29 | −46.1490 | 0.8000 | 1.90366 | 31.31 |
| 30 | 26.2451 | 0.3800 | | |
| 31 | 31.8064 | 4.5000 | 1.61293 | 37.00 |
| 32 | −37.8637 | D (32) | | |

TABLE 29

| F | 18.5400 | 60.1100 | 194.9329 |
|---|---|---|---|
| Fno | 3.6649 | 5.3376 | 6.4466 |
| W | 39.0745 | 13.1688 | 4.1752 |
| D (5) | 1.5138 | 25.1995 | 48.8656 |
| D (13) | 27.6423 | 11.1430 | 1.8088 |
| D (20) | 2.7248 | 2.5603 | 1.7730 |
| D (24) | 7.8979 | 2.8172 | 1.3800 |
| D (32) | 41.4174 | 75.4358 | 95.4506 |

TABLE 30

| No. | K | A4 | A6 | A8 | A10 |
|---|---|---|---|---|---|
| 8 | 0.00000E+00 | −1.14769E−05 | 4.70839E−08 | −2.63504E−09 | 1.24054E−11 |
| 9 | 0.00000E+00 | −4.98347E−05 | −4.49970E−08 | −1.88618E−09 | 6.45086E−12 |
| 21 | 0.00000E+00 | 1.19796E−05 | −2.92430E−08 | 9.47719E−10 | −7.32654E−12 |
| 25 | 0.00000E+00 | −1.07090E−05 | −4.72810E−07 | −2.76695E−09 | 2.07109E−11 |
| 26 | 0.00000E+00 | 2.99368E−05 | −4.59231E−07 | −2.41715E−09 | 2.15679E−11 |

Example 11

Next, Example 11 will be described. Since the optical system 100 of the zoom lens in Example 11 is almost the same in lens arrangement as that in Example 1 also, only differences including the lens arrangement from those in Example 1 will be described. In the optical system 100 in Example 11, the group 3b among the groups 3a and 3b constituting the third lens group G3 may also shift in the direction perpendicular to the optical axis for the vibration compensation. The shift of the group 3b for the vibration compensation is 0.089 mm, 0.181 mm, and 0.474 mm at the wide-angle end, the intermediate focal length and the telescope end respectively at a correction angle of 0.3°.

Figure 32:
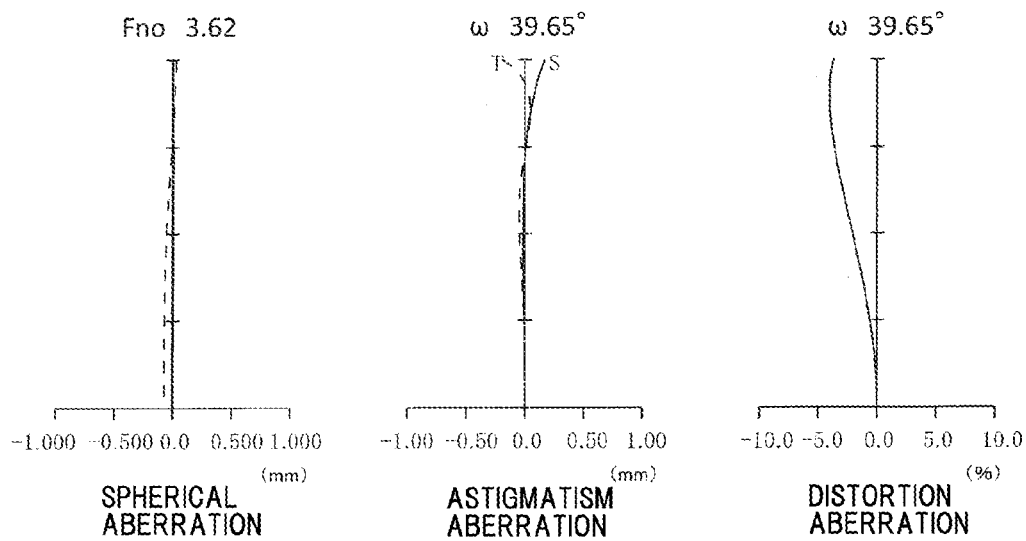
FIG. 32 is an aberration diagram at a zoom wide-angle end of the zoom lens in Example 11.
Figure 33:
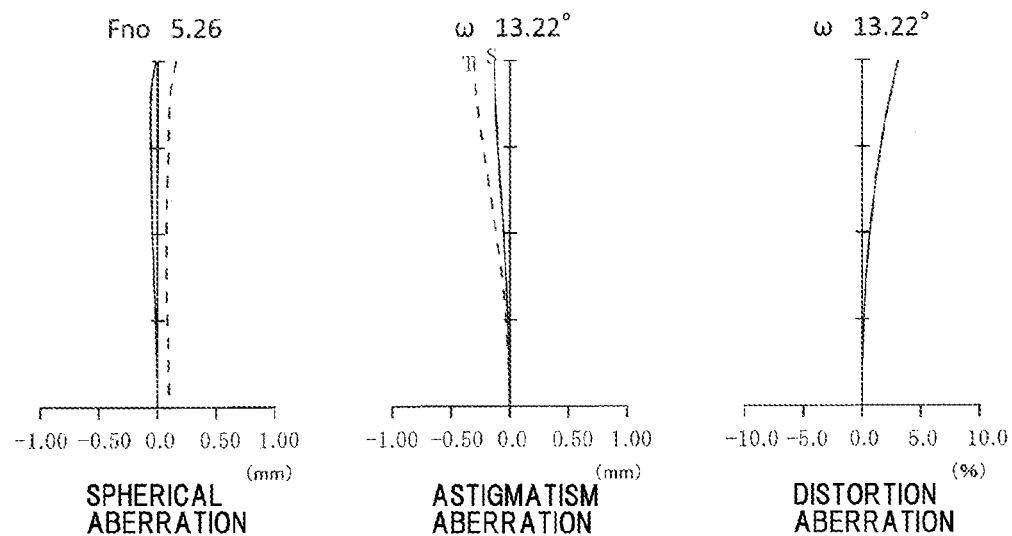
FIG. 33 is an aberration diagram at a zoom intermediate focal point of the zoom lens in Example 11.
Figure 34:
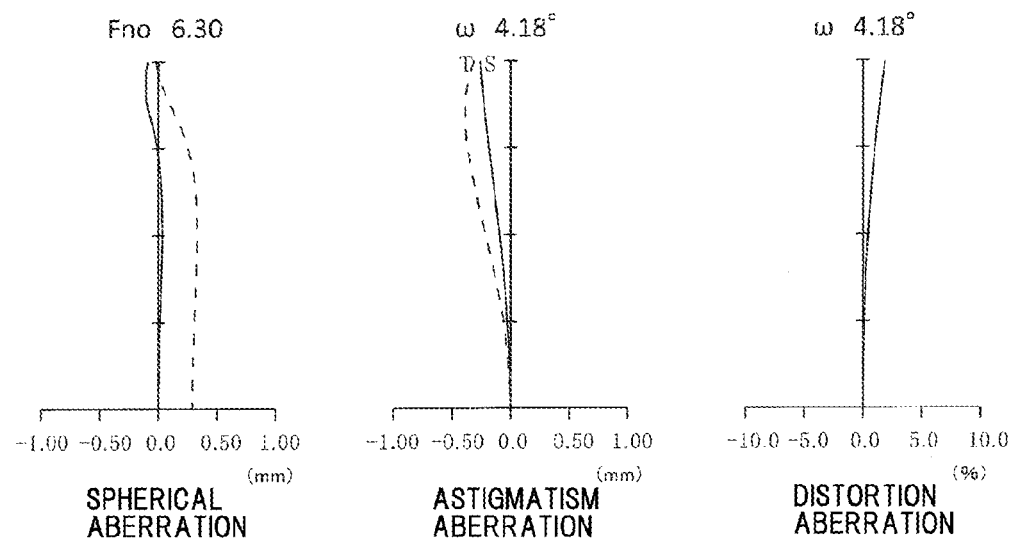
FIG. 34 is an aberration diagram at a zoom telescope end of the zoom lens in Example 11.

Tables 31, 32, and 33 respectively show the data on the respective lenses constituting the optical system 100 of the zoom lens in Example 11 including the data on the lens surfaces, the focal lengths and the aspherical surfaces. The numerical values in the respective expressions are also shown in FIG. 35. FIG. 32 is a longitudinal aberration diagram at the wide-angle end, FIG. 33 is a longitudinal aberration diagram at the intermediate focal length, and FIG. 34 is a longitudinal aberration diagram at the telescope end in Example 11.

TABLE 31

| No. | R | D | Nd | ABV |
|---|---|---|---|---|
| 1 | 81.0662 | 1.2000 | 1.84666 | 23.78 |
| 2 | 53.5297 | 6.6000 | 1.49700 | 81.61 |
| 3 | −814.2792 | 0.2000 | | |
| 4 | 52.2329 | 4.4000 | 1.51742 | 52.15 |
| 5 | 195.9920 | D (5) | | |
| 6 | 195.9920 | 1.1000 | 1.83481 | 42.72 |
| 7 | 12.8669 | 6.4500 | | |
| 8 ASPH | −26.6048 | 1.0000 | 1.53103 | 58.27 |
| 9 ASPH | 98.2891 | 0.2000 | | |
| 10 | 50.8434 | 4.4000 | 1.80518 | 25.46 |
| 11 | −23.3493 | 0.4600 | | |
| 12 | −19.0740 | 0.7000 | 1.77250 | 49.62 |
| 13 | −230.6555 | D (13) | | |
| 14 STOP | 0.0000 | 0.9000 | | |
| 15 | 32.4971 | 3.6000 | 1.48749 | 70.44 |
| 16 | −34.7066 | 1.9500 | | |
| 17 | 23.1922 | 3.6000 | 1.48749 | 70.44 |
| 18 | −89.2603 | 0.4500 | | |
| 19 | −42.0273 | 0.8000 | 1.84666 | 23.78 |
| 20 | −467.3151 | D (20) | | |
| 21 ASPH | −47.8795 | 0.2000 | 1.51460 | 49.96 |
| 22 | −48.3845 | 0.7000 | 1.83400 | 37.34 |
| 23 | 16.8825 | 3.0000 | 1.80518 | 25.46 |
| 24 | 194.2614 | D (24) | | |
| 25 ASPH | 34.3111 | 1.2000 | 1.53103 | 58.27 |
| 26 ASPH | 37.7297 | 0.1500 | | |
| 27 | 37.0491 | 5.6000 | 1.51680 | 64.20 |
| 28 | −20.7740 | 0.1600 | | |
| 29 | −37.6215 | 0.8000 | 1.90366 | 31.31 |
| 30 | 29.7997 | 0.3800 | | |
| 31 | 35.8567 | 4.5000 | 1.61293 | 37.00 |
| 32 | −32.7692 | D (32) | | |

TABLE 32

| F | 18.5136 | 60.0681 | 194.9318 |
|---|---|---|---|
| Fno | 3.6223 | 5.2626 | 6.2969 |
| W | 39.6510 | 13.2226 | 4.1751 |
| D (5) | 1.5962 | 25.3923 | 48.9184 |
| D (13) | 27.6928 | 11.2082 | 1.8013 |
| D (20) | 2.8381 | 2.4372 | 1.6000 |
| D (24) | 8.0972 | 2.3333 | 1.2000 |
| D (32) | 41.9921 | 76.3615 | 96.9967 |

TABLE 33

| No. | K | A4 | A6 | A8 | A10 |
|---|---|---|---|---|---|
| 8 | 0.00000E+00 | 1.31599E−05 | −2.73202E−08 | −3.40841E−09 | 2.47387E−11 |
| 9 | 0.00000E+00 | −2.32801E−05 | −1.87538E−07 | −1.36401E−09 | 8.45448E−12 |
| 21 | 0.00000E+00 | 1.24302E−05 | −5.08935E−08 | 1.07027E−09 | −6.51853E−12 |
| 25 | 0.00000E+00 | 1.70166E−05 | −6.84744E−07 | −3.95111E−09 | 2.71942E−11 |
| 26 | 0.00000E+00 | 6.02044E−05 | −7.15308E−07 | −3.74756E−09 | 3.10070E−11 |

SYMBOL LIST

21 Negative meniscus lens arranged at closest to the object in the second lens group
22 Negative lens arranged next to the negative meniscus lens
41 Lens arranged at closest to the object in the fourth lens group
100 Optical system
G1 First lens group
G2 Second lens group
G3 Third lens group
G3a Group 3a
G3b Group 3b
G4 Fourth lens group

The invention claimed is:

1. A zoom lens comprising at least a first lens group having a positive refractive power, a second lens group having a negative refractive power, a third lens group having a positive refractive power, and a fourth lens group having a positive refractive power arranged in this order from an object side to constitute an optical system, and all the lens groups constituting the optical system move along an optical axis direction for adjustment of distance between the respective lens groups to achieve a predetermined magnification change,
wherein the second lens group includes a negative meniscus lens arranged at closest to an object provided with a convex surface at the object side, a negative lens arranged next to the negative meniscus lens and a negative lens arranged at closest to an image provided with a concave surface at the object side,
the fourth lens group includes at least two positive lenses and one negative lens, and wherein
the lenses described below arranged in the second lens group and the fourth lens group satisfy following expressions (1) and (2):

[Expression 1]

$$1.48 \leq (NV+NL)/2 \leq 1.62 \quad (1)$$

$$38 \leq (VV+VL)/2 \leq 62 \quad (2)$$

in the expressions (1) and (2);
NV: Refractive index for a d-line of the negative lens in the second lens group arranged next to the negative meniscus lens
VV: Abbe number of the negative lens in the second lens group arranged next to the negative meniscus lens
NL: Refractive index for a d-line of the lens in the fourth lens group arranged at closest to the object
VL: Abbe number of the lens in the fourth lens group arranged at the closest to the object.

2. The zoom lens according to claim 1, satisfying a following expression (3):

[Expression 2]

$$1.6 \leq 22/f21 \leq 3.4 \quad (3)$$

in the expression (3);
f21: Focal length of the negative meniscus lens in the second lens group arranged at closest to the object
f22: Focal length of the negative lens in the second lens group arranged next to the negative meniscus lens.

3. The zoom lens according to claim 1, wherein the lens in the fourth lens group arranged at closest to the object is a double-sided aspherical lens provided with aspherical surfaces at both sides, and satisfies a following expression (4):

[Expression 3]

$$2.91 \leq |fp/f| \leq 19.5 \quad (4)$$

in the expression (4);
f4: Focal length of the fourth lens group
fp: Focal length of the lens in the fourth lens group arranged at closest to the object.

4. The zoom lens according to claim 1, wherein the negative lens in the second lens group arranged next to the negative meniscus lens is provided with an aspherical surface at least on an image side, and satisfies a following expression (5):

[Expression 4]

$$-0.07 \leq \Delta 2/f2 \leq 0.07 \quad (5)$$

In the expression (5);
Δ2: Deformation amount of the aspherical surface relative to the base spherical surface from the optical axis to the effective radial position.

5. The zoom lens according to claim 1, satisfying a following expression (6):

[Expression 5]

$$-44 \leq f123t/f4 \times Z \leq -23 \quad (6)$$

in the expression (6);
f123t: Synthetic focal length of the first lens group to the third lens group at a telescope end
f4: Focal length of the fourth lens group
Z: Zoom ratio ([a focal length at the telescope end]/[a focal length at a wide-angle end]).

6. The zoom lens according to claim 1, satisfying a following expression (7):

[Expression 6]

$$0.21 \leq |M2/M1| \leq 0.42 \quad (7)$$

in the expression (7);
M1: Travel distance of the first lens group from the wide-angle end to the telescope end (travel distance to the object side is positive)
M2: Travel distance of the second lens group from the wide-angle end to the telescope end (travel distance to the object side is positive).

7. The zoom lens according to claim 1, wherein the lens groups move from a wide-angle end to a telescope end for magnification change to increase distance between the first lens group and the second lens group, to decrease distance between the second lens group and the third lens group, and to decrease distance between the third lens group and the fourth lens group.

8. The zoom lens according to claim 1, wherein the third lens group includes a group 3a having a positive refractive power and a group 3b having a negative refractive power, wherein
the group 3b shifts in the direction perpendicular to the optical axis for vibration compensation.

9. The zoom lens according to claim 1, wherein the third lens group includes a group 3a having a positive refractive power and a group 3b having a negative refractive power, and the lens groups move from a wide-angle end to a telescope end for magnification change through increasing distance between the first lens group and the second lens group, decreasing distance between the second lens group and the group 3a to change distance between the group 3a and the group 3b, and decrease distance between the group 3b and the fourth lens group.

10. The zoom lens according to claim 9, wherein the group 3b shifts in the direction perpendicular to the optical axis for vibration compensation.

11. The zoom lens according to claim 1, wherein the lens groups constituting the optical system include the first lens group to the fourth lens group and a fifth lens group next to the fourth lens group, wherein
the lens groups move from a wide-angle end to a telescope end to increase distance between the first lens group and the second lens group, to decrease distance between the second lens group and the third lens group, to decrease distance between the third lens group and the fourth lens group and to increase distance between the fourth lens group and the fifth lens group for magnification change.

12. The zoom lens according to claim 1, wherein the lens groups constituting the optical system further including a fixed lens or a fixed lens group in addition to the first lens group to the fourth lens group at closest to the image.

13. The zoom lens according to claim 1, wherein the second lens group moves to the object side from an infinite object distance to a closest distance in focusing.

* * * * *

UNITED STATES PATENT AND TRADEMARK OFFICE
CERTIFICATE OF CORRECTION

PATENT NO. : 9,030,754 B2
APPLICATION NO. : 14/100617
DATED : May 12, 2015
INVENTOR(S) : Nobuyuki Adachi Page 1 of 1

It is certified that error appears in the above-identified patent and that said Letters Patent is hereby corrected as shown below:

In the claims

Column 35, Line 36, Claim 2, delete "$1.6 \leq 22/f21 \leq 3.4$" and insert -- $1.6 \leq f22/f21 \leq 3.4$ --

Column 35, Line 49, Claim 3, delete "$2.91 \leq |fp/f| \leq 19.5$" and insert -- $2.9 \leq |fp/f4| \leq 19.5$ --

Column 35, Line 61, Claim 4, delete "In" and insert -- in --

Signed and Sealed this
Thirteenth Day of October, 2015

Michelle K. Lee
*Director of the United States Patent and Trademark Office*